US009965365B2

(12) United States Patent
Lee et al.

(10) Patent No.: US 9,965,365 B2
(45) Date of Patent: May 8, 2018

(54) POWER SUPPLY FAILOVER SYSTEM AND METHOD

(71) Applicant: Lite-On, Inc., Milpitas, CA (US)

(72) Inventors: Victor K. J. Lee, Dallas, TX (US); Yung Hsiang Liu, New Taipei (TW); Wei Kang Liang, New Taipei (TW); Yu Kai Wang, New Taipei (TW); Chih Hung Chiang, New Taipei (TW)

(73) Assignee: LITE-ON, INC., Milpitas, CA (US)

(*) Notice: Subject to any disclaimer, the term of this patent is extended or adjusted under 35 U.S.C. 154(b) by 113 days.

(21) Appl. No.: 15/004,585

(22) Filed: Jan. 22, 2016

(65) Prior Publication Data

US 2016/0154716 A1 Jun. 2, 2016

Related U.S. Application Data

(63) Continuation-in-part of application No. 14/928,744, filed on Oct. 30, 2015, now Pat. No. 9,537,351, which
(Continued)

(51) Int. Cl.
*G06F 11/00* (2006.01)
*G06F 11/20* (2006.01)
*G06F 1/30* (2006.01)

(52) U.S. Cl.
CPC .......... *G06F 11/2015* (2013.01); *G06F 1/30* (2013.01)

(58) Field of Classification Search
CPC .................. G06F 11/2015; G06F 1/30
(Continued)

(56) References Cited

U.S. PATENT DOCUMENTS 5,612,580 A * 3/1997 Janonis .............. H02J 9/062
  307/64
7,536,576 B2 * 5/2009 Shima .............. G06F 1/26
  361/601
(Continued)

FOREIGN PATENT DOCUMENTS

DE     3031981 A1   4/1982
DE  10200802422 A1   2/2009
(Continued)

OTHER PUBLICATIONS

EPO, European Search Report for EP1419244 dated Jul. 10, 2015.
EPO, European Search Report for EP14199267 dated May 7, 2015.

*Primary Examiner* — Joseph D Manoskey
(74) *Attorney, Agent, or Firm* — David W. Carstens; Carstens & Cahoon, LLP

(57) ABSTRACT

A power supply failover system/method providing uninterruptable power to protected load devices (PLD) is disclosed. The system includes a failover switch controller (FSC) with inputs from an AC I/V monitor (AIV), AC cycle counter (ACC), failover switch timer (FST), and overcurrent protection timer (OPT). The FSC utilizes these inputs to control failsafe switching of a bypass phase switch (BPS) and AC phase switch (ACS) to the PLD when power from the APS is determined to be good by the AIV. When power from the APS is determined to be compromised by the AIV, the FPS disables the ACS/BPS and enables a DC switch (DCS) and battery isolation switch (BIS) to connect a DC source to the PLD after a time period determined by the FST. APS/DCS overcurrent protection is limited by OPT intervals allowing a smooth transition between the APS to DCS during power failover/failback.

30 Claims, 24 Drawing Sheets

Related U.S. Application Data is a continuation-in-part of application No. 14/925,754, filed on Oct. 28, 2015, now Pat. No. 9,537,341, which is a continuation-in-part of application No. 14/843,880, filed on Sep. 2, 2015, now Pat. No. 9,444,280, which is a continuation of application No. 14/565,754, filed on Dec. 10, 2014, now Pat. No. 9,509,158, which is a continuation-in-part of application No. 14/509,454, filed on Oct. 8, 2014, now Pat. No. 9,047,075, which is a continuation of application No. 14/461,110, filed on Aug. 15, 2014, now Pat. No. 9,047,076.

(60) Provisional application No. 62/245,833, filed on Oct. 23, 2015, provisional application No. 62/245,826, filed on Oct. 23, 2015, provisional application No. 62/245,807, filed on Oct. 23, 2015, provisional application No. 61/922,311, filed on Dec. 31, 2013.

(58) Field of Classification Search
USPC .......................................................... 714/14
See application file for complete search history.

(56) References Cited

U.S. PATENT DOCUMENTS

| | | | |
|---|---|---|---|
| 8,010,823 B2 * | 8/2011 | Sartain | G06F 1/30 307/125 |
| 9,047,075 B1 | 6/2015 | Lee | |
| 9,047,076 B1 | 6/2015 | Lee | |
| 9,317,093 B2 * | 4/2016 | Uehara | G06F 1/30 |
| 2004/0164618 A1 | 8/2004 | Bryde | |
| 2005/0036253 A1 * | 2/2005 | Tian | H02J 3/38 361/66 |
| 2005/0043859 A1 * | 2/2005 | Tsai | H02J 3/46 700/286 |
| 2006/0050465 A1 | 3/2006 | Cho et al. | |
| 2006/0221523 A1 * | 10/2006 | Colombi | H02J 9/062 361/90 |
| 2010/0180139 A1 | 7/2010 | Denney et al. | |
| 2011/0110009 A1 * | 5/2011 | Sugimoto | H03K 17/0822 361/93.1 |
| 2011/0291606 A1 | 12/2011 | Lee | |
| 2012/0044607 A1 * | 2/2012 | Loewe | H03K 17/0826 361/91.1 |
| 2012/0081078 A1 | 4/2012 | Matsumura et al. | |
| 2012/0086269 A1 | 4/2012 | Nakano et al. | |
| 2012/0311352 A1 * | 12/2012 | Luo | G11O 5/145 713/300 |
| 2013/0020872 A1 | 1/2013 | Kinnard | |
| 2013/0043929 A1 * | 2/2013 | Chen | G06F 1/263 327/535 |
| 2013/0141828 A1 | 6/2013 | Yamaguchi et al. | |
| 2013/0198537 A1 * | 8/2013 | Uehara | G06F 1/30 713/300 |
| 2013/0246815 A1 | 9/2013 | Uehara | |
| 2014/0001861 A1 * | 1/2014 | Mann | G06F 1/30 307/66 |
| 2014/0001871 A1 * | 1/2014 | Vogman | H02J 5/00 307/82 |
| 2014/0097690 A1 * | 4/2014 | Costa | H02J 9/00 307/64 |
| 2014/0101464 A1 * | 4/2014 | Hsiao | G06F 1/30 713/300 |
| 2016/0006299 A1 * | 1/2016 | Myhre | G06F 1/30 307/66 |

FOREIGN PATENT DOCUMENTS

| | | |
|---|---|---|
| EP | 2833504 A1 | 2/2015 |
| KR | 101322617 B1 | 10/2013 |

* cited by examiner

POWER SUPPLY FAILOVER SYSTEM AND METHOD

CROSS REFERENCE TO RELATED APPLICATIONS

This application claims the benefit of U.S. Provisional Application No. 62/245,833, filed Oct. 23, 2015 and is a continuation-in-part of U.S. application Ser. No. 14/928,744, filed Oct. 30, 2015; and said U.S. application Ser. No. 14/928,744 claims the benefit of U.S. Provisional Application No. 62/245,826, filed Oct. 23, 2015 and is a continuation-in-part of U.S. application Ser. No. 14/925,754, filed Oct. 28, 2015; and said U.S. application Ser. No. 14/925,754 claims the benefit of U.S. Provisional Application No. 62/245,807, filed Oct. 23, 2015 and is a continuation-in-part of U.S. application Ser. No. 14/843,880, filed Sep. 2, 2015, which is a continuation of U.S. application Ser. No. 14/565,754, filed Dec. 10, 2014, which is a continuation-in-part of U.S. application Ser. No. 14/509,454, filed Oct. 8, 2014, now U.S. Pat. No. 9,047,075, which is a continuation of U.S. application Ser. No. 14/461,110, filed Aug. 15, 2014, now U.S. Pat. No. 9,047,076, which claims the benefit of U.S. Provisional Application No. 61/922,311, filed Dec. 31, 2013, the disclosures of which are fully incorporated herein by reference.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods associated with uninterruptable power supplies (UPS). Specifically, the present invention relates in some preferred embodiments to UPS power supply failover systems/methods as applied to large computing data centers.

PRIOR ART AND BACKGROUND OF THE INVENTION

Within the context of modern data centers there is a need to provide for uninterrupted power to protected load devices that are serviced by power supply units (PSU). The PSU architecture described in U.S. patent applications incorporated by reference herein (Ser. No. 14/461,110 and Ser. No. 14/509,454) may be configured in a variety of ways to ensure that this requirement for uninterrupted protected load power supply is achieved. The present invention describes a variety of power supply failover systems/methodologies to achieve this desired result.

BRIEF SUMMARY OF THE INVENTION

The present invention augments the AC+DC power supply failovers detailed in U.S. patent applications incorporated by reference herein (Ser. No. 14/461,110 and Ser. No. 14/509,454) by providing for a variety of systems and methods to ensure uninterrupted service to protected load devices via monitoring of power supply sources (PSS) and digitally controlled switching of these PSS to AC+DC power supplies that service the protected load devices.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
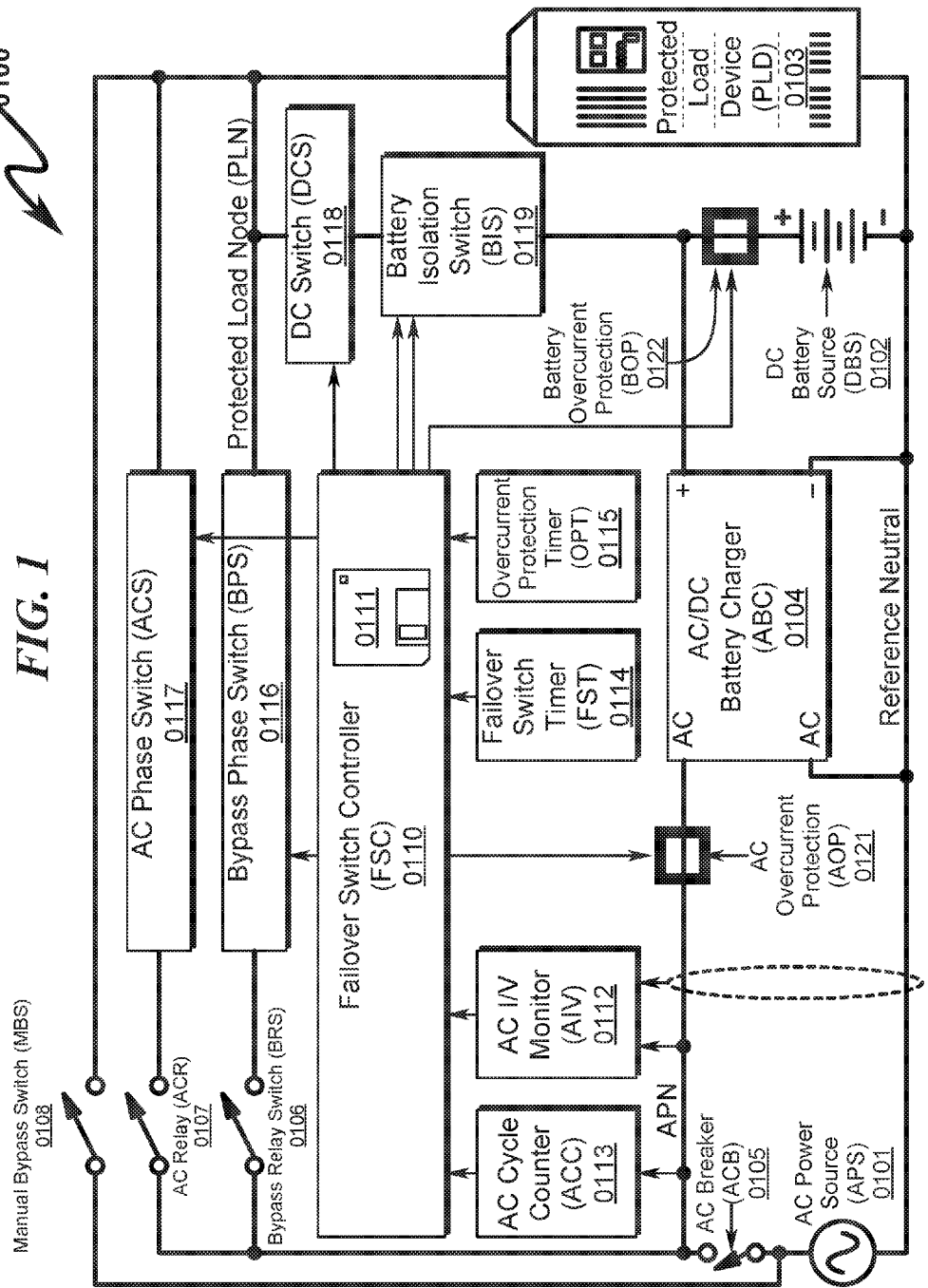
FIG. 1 illustrates a block diagram of a preferred exemplary system embodiment of the present invention.

While this invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a POWER SUPPLY FAILOVER SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Switch Methodology not Limitive

The present invention will be discussed in the context of a variety of boost converter topologies, some of which are preferred depending on application context. These converter topologies will be shown to incorporate MOSFET electrical switches, but the present invention is not limited in scope to the use of these devices and may incorporate any form of electrical switch, such as (but not limited to) bipolar transistors, MOSFETs, IGBTs, SCRs, TRIACs, etc.

Control System not Limitive

The present invention may utilize a wide variety of constructs when implementing the power controller described herein. Many preferred invention embodiments may utilize a computerized control mechanism wherein the computer system executes machine instructions read from a tangible, non-transitory, computer readable medium.

PLD Internal Power Supply Units (PSU)

The present invention anticipates that the PLD (0103) may incorporate internal power supply units (PSU) that are configured as AC+DC power supplies as described in U.S. Utility patent application for UNINTERRUPTABLE POWER SUPPLY SYSTEM AND METHOD by inventor Victor K. J. Lee, filed electronically with the USPTO on Aug. 15, 2014, Ser. No. 14/461,110 and U.S. Utility patent application for UNINTERRUPTABLE POWER SUPPLY SYSTEM AND METHOD by inventor Victor K. J. Lee, filed electronically with the USPTO on Oct. 8, 2014, Ser. No. 14/509,454, incorporated herein by reference. In this context, the present invention describes systems and methods of configuring the switching to these AC+DC power supplies to provide uninterrupted power service to the PLD (0103).

System Overview (0100)-(0200)

A preferred exemplary system embodiment of the present invention is depicted in FIG. 1 (0100). In this application context, an AC power source (APS) (0101) and DC battery source (DBS) (0102) are used to supply uninterrupted power to a protected load device (PLD) (0103) serviced by a number of AC+DC power supplies (not shown). The DBS (0102) is kept charged by an AC/DC battery charger (ABC) (0104) powered by the APS (0101). AC main breaker (0105) provides a main disconnect for the APS (0101).

The system as depicted permits failover between the APS (0101) and DC battery source (0102) such that the PLD (0103) is kept powered in the event of a failure of the APS (0101). This is accomplished by the use of a custom hardware failover switch controller (FSC) (0110) operating under control of machine instructions read from a computer readable medium (0111). The FSC (0110) operates to monitor the status of the APS (0101) using an AC current/voltage (I/V) monitor (AIV) (0112) and an AC cycle counter (ACC) (0113) to determine when a failover transition between the APS (0101) and the DC battery source (0102) is to occur and when a failback transition between the DC battery source (0102) and the APS (0101) is to occur. Within these failover/failback transitions a failover switch timer (FST) (0114) and an overcurrent protection timer (OPT) (0115) are used to coordinate the exact transition times associated with the failover/failback.

The system as depicted incorporates safety measures to ensure against system failure in the event of an individual component failure. Under normal conditions, the FSC (0110) has control over a bypass phase switch (BPS) (0116) and AC phase switch (ACS) (0117) that control current flow from the APS (0101) to the PLD (0103). The BPS (0116) and ACS (0117) have associated bypass relay switch (BRS) (0106) and AC relay (ACR) (0107) that permit the corresponding BPS (0116) and ACS (0117) to be isolated in the event of a component failure in either of these switches. For maintenance purposes, a master AC breaker (ACB) (0105) and manual bypass switch (MBS) (0108) are provided to either isolate the APS (0101) or directly connect it to the PLD (0103) for the purposes of repair/maintenance of other system components. With respect to protection of the DBS (0102), a DC switch (DCS) (0118) and battery isolation switch (BIS) (0119) are placed in series with the DBS (0102) and can be independently controlled by the failover switch controller (FSC) (0110) to isolate the DBS (0102) in the event of a detected failure in either the DCS (0118) or the BIS (0119).

The system as depicted incorporates AC overcurrent protection (AOP) (0121) and DC overcurrent protection (0122) that can be enabled/disabled under control of the FSC (0110). This overcurrent protection control by the FSC (0110) permits transitions between the APS (0101) and DBS (0102) to occur without tripping the overcurrent protection but still provide controlled power source protection under normal operating conditions.

Figure 2:
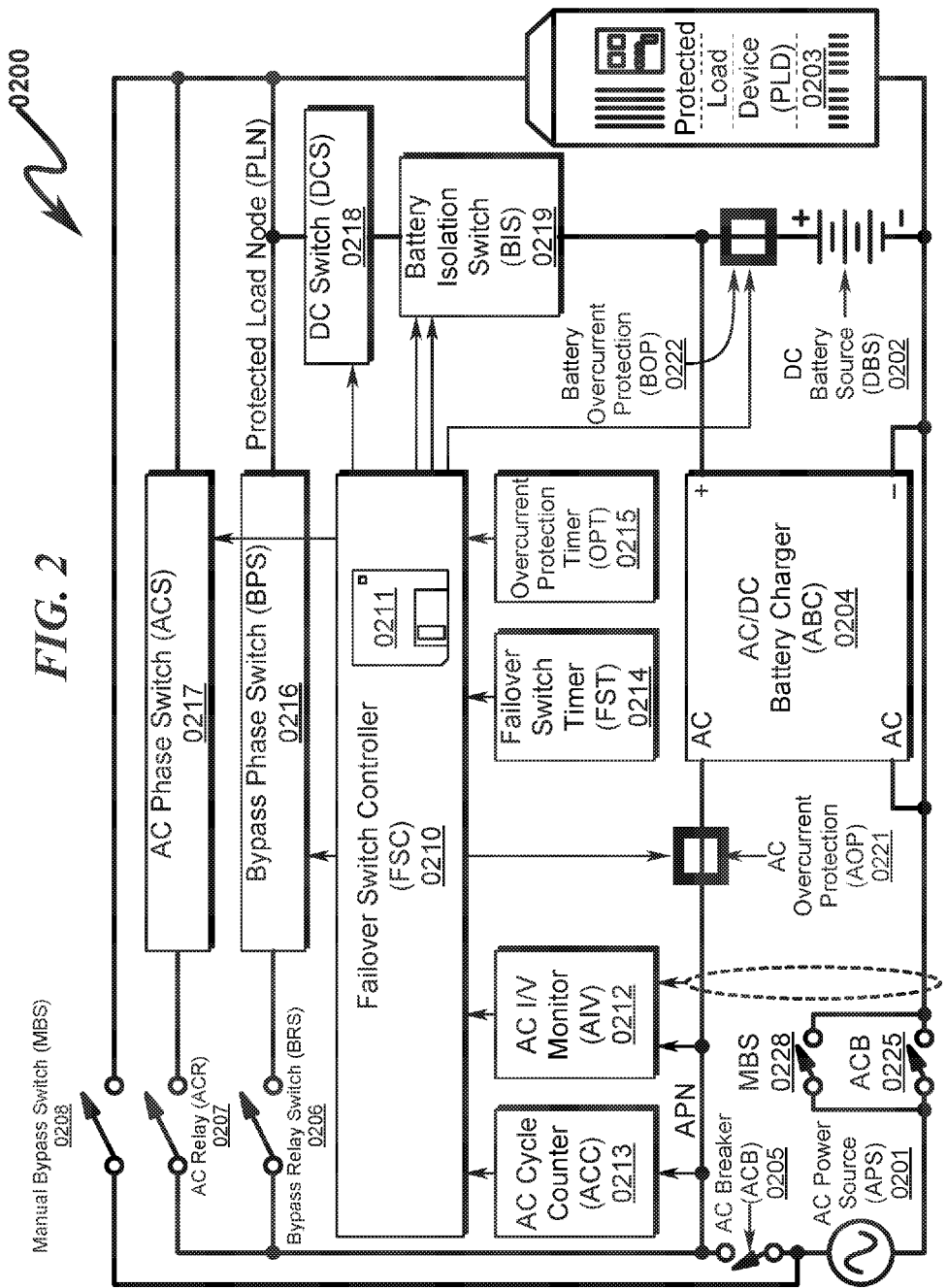
FIG. 2 illustrates an alternate block diagram of a preferred exemplary system embodiment of the present invention.

An alternative system embodiment is generally depicted in FIG. 2 (0200) and corresponds to the structure illustrated in FIG. 1 (0100) with the exception of additional AC circuit breaker (ACB) (0225) and manual bypass switch (MBS) (0228) that service the neutral line of the AC power source (APS) (0201). This permits complete maintenance service and isolation of the ACBs (0205, 0225) as well as the APS (0201).

Exemplary Bypass Phase Switch (BPS) (0300)

Figure 3:
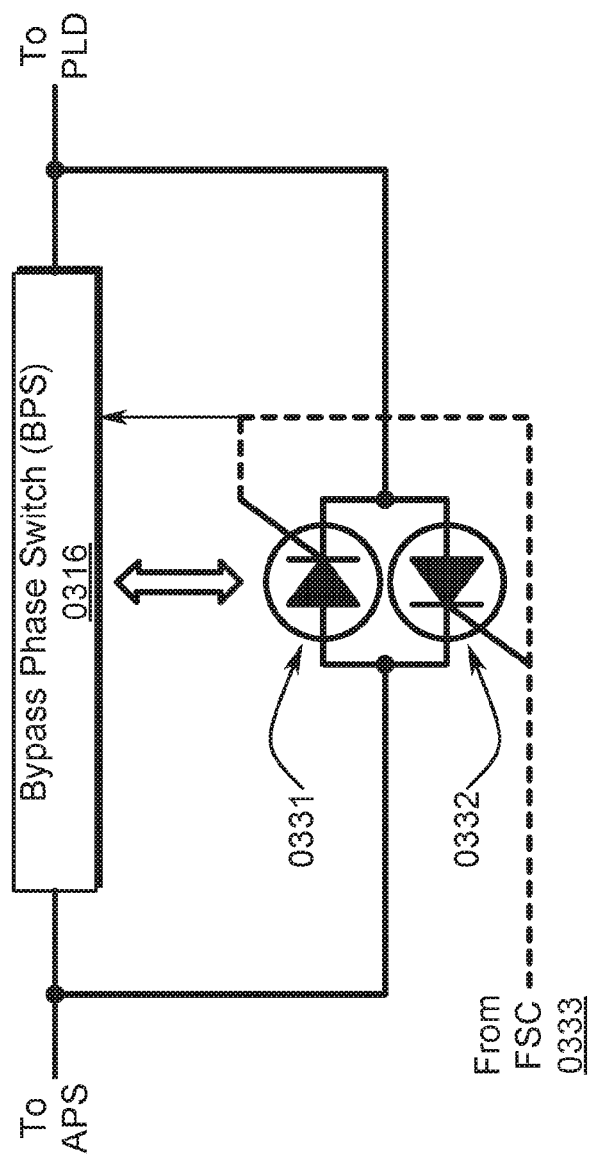
FIG. 3 illustrates a preferred exemplary bypass phase switch (BPS) embodiment useful in some preferred invention embodiments.

FIG. 3 (0300) depicts a preferred exemplary implementation of the Bypass Phase Switch (BPS) (0316). These switches are implemented in this preferred embodiment using SCRS (0331, 0332) configured in series opposition and controlled by electrical stimulus from the failover switch controller (FSC) (0333).

Exemplary AC Phase Switch (ACS) (0400)

Figure 4:
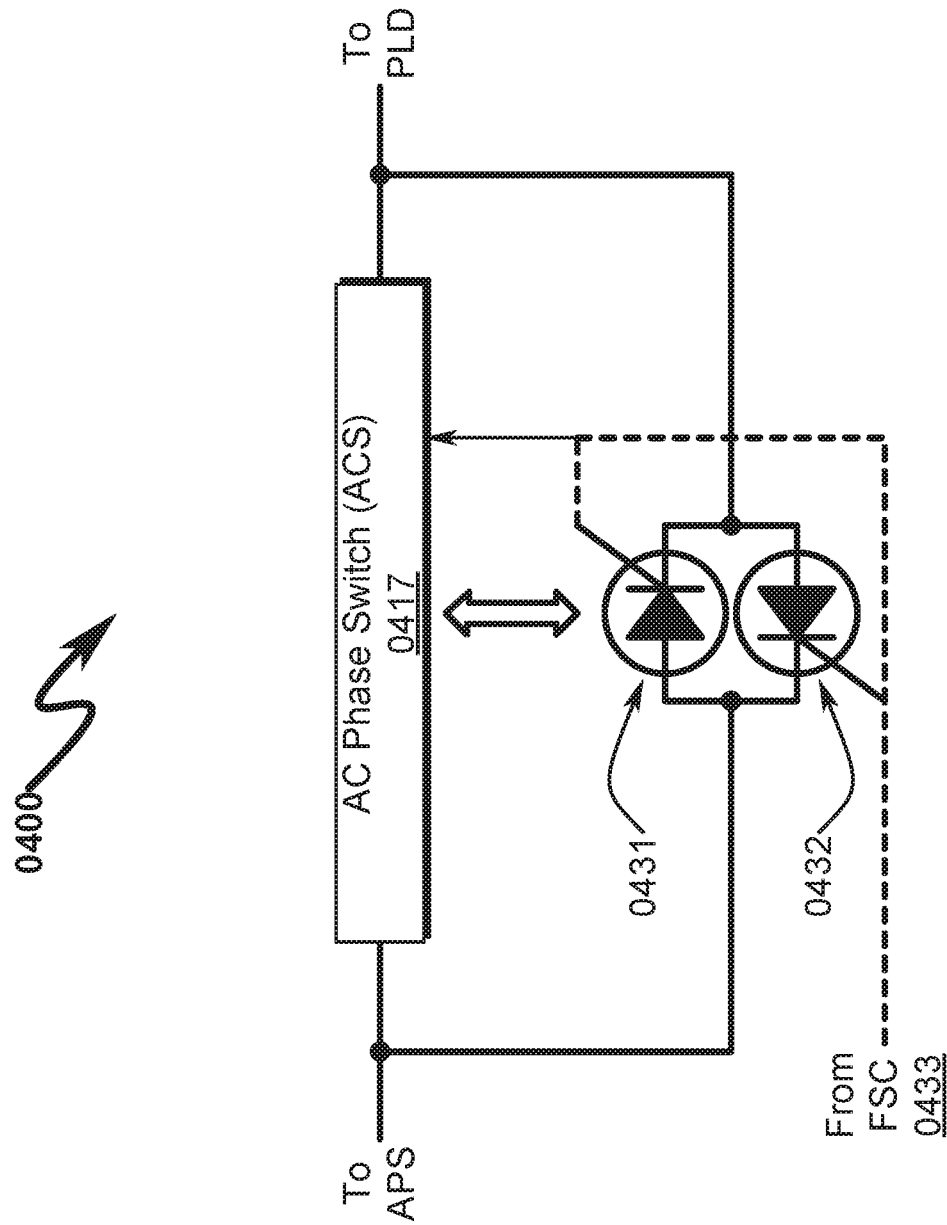
FIG. 4 illustrates a preferred exemplary AC phase switch (ACS) embodiment useful in some preferred invention embodiments.

FIG. 4 (0400) depicts a preferred exemplary implementation of the AC Phase Switch (ACS) (0417). These switches are implemented in this preferred embodiment using SCRS (0431, 0432) configured in series opposition and controlled by electrical stimulus from the failover switch controller (FSC) (0433).

Exemplary DC Switch (DCS) (0500)

Figure 5:
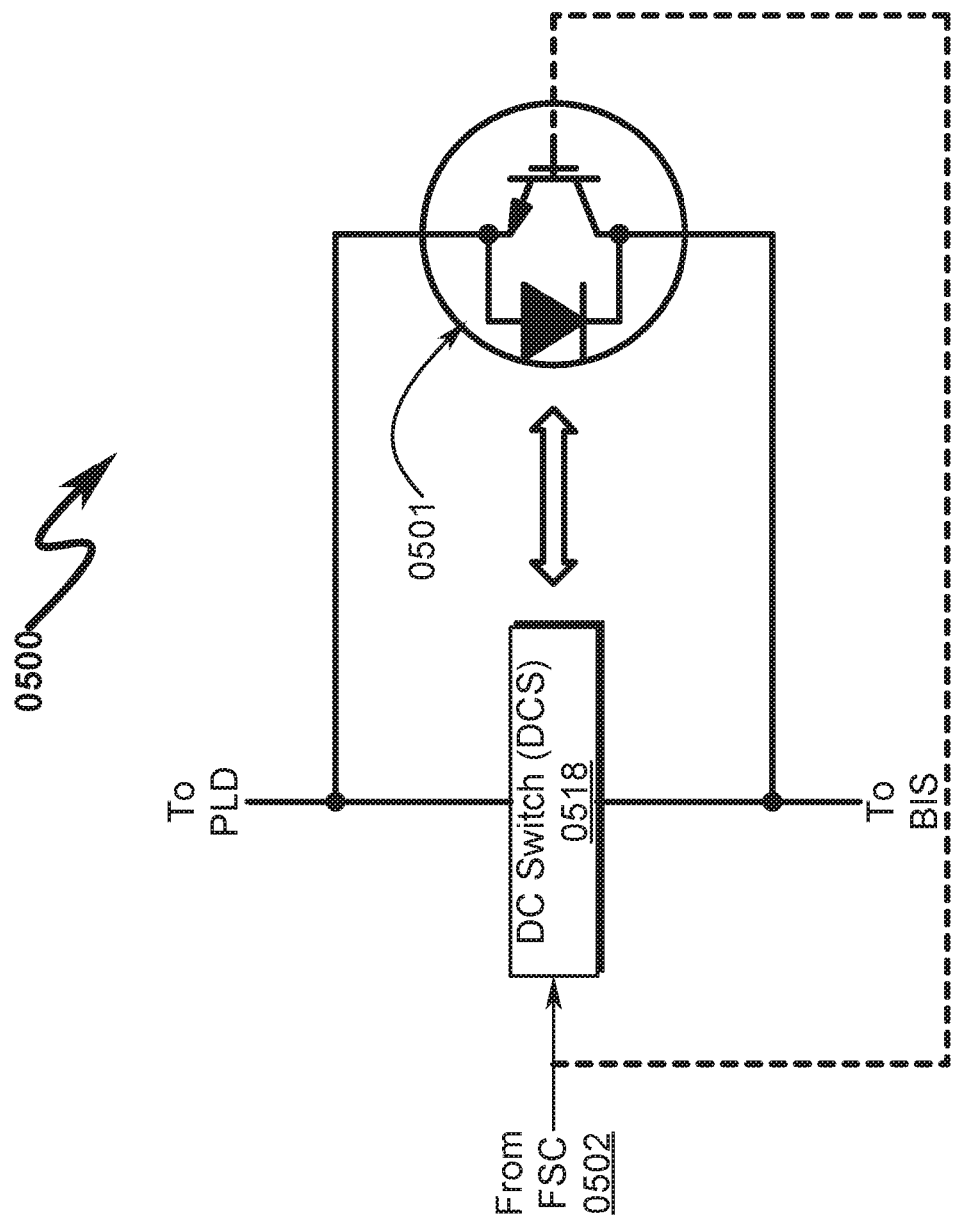
FIG. 5 illustrates a preferred exemplary DC switch (DCS) embodiment useful in some preferred invention embodiments.

FIG. 5 (0500) depicts a preferred exemplary implementation of the DC Switch (DCS) (0518). These switches are implemented in this preferred embodiment using an NPN-IGBT (0501) controlled by electrical stimulus from the failover switch controller (FSC) (0502).

Exemplary Battery Isolation Switch (BIS) (0600)

Figure 6:
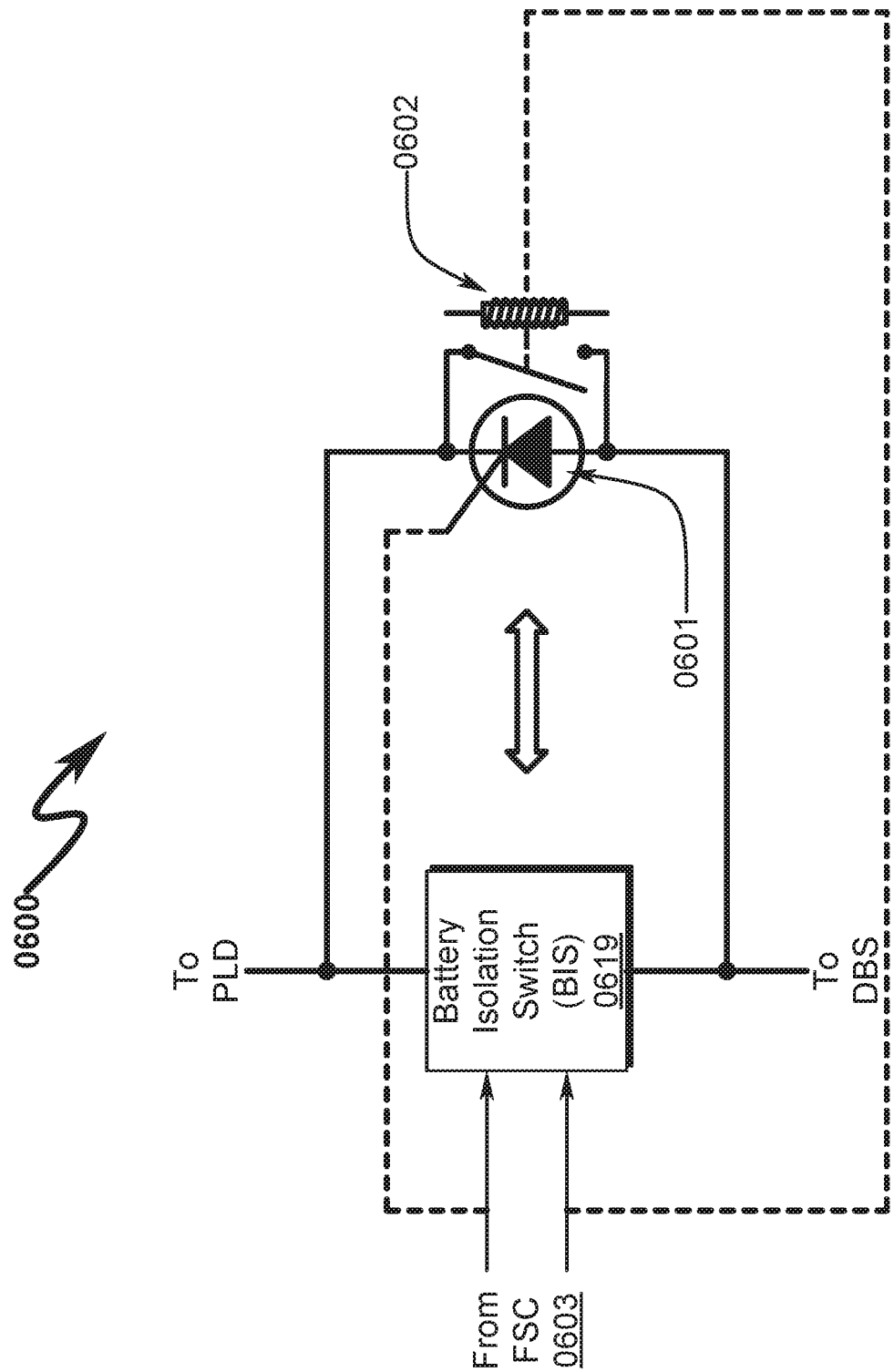
FIG. 6 illustrates a preferred exemplary battery isolation switch (BIS) embodiment useful in some preferred invention embodiments.

FIG. 6 (0600) depicts a preferred exemplary implementation of the Battery Isolation Switch (DCS) (0619). These switches are implemented in this preferred embodiment using a parallel combination of a SCR (0601) and a relay (0602) controlled by electrical stimulus from the failover switch controller (FSC) (0603).

Exemplary AC/DC Battery Charger (ABC) (0700)

Figure 7:
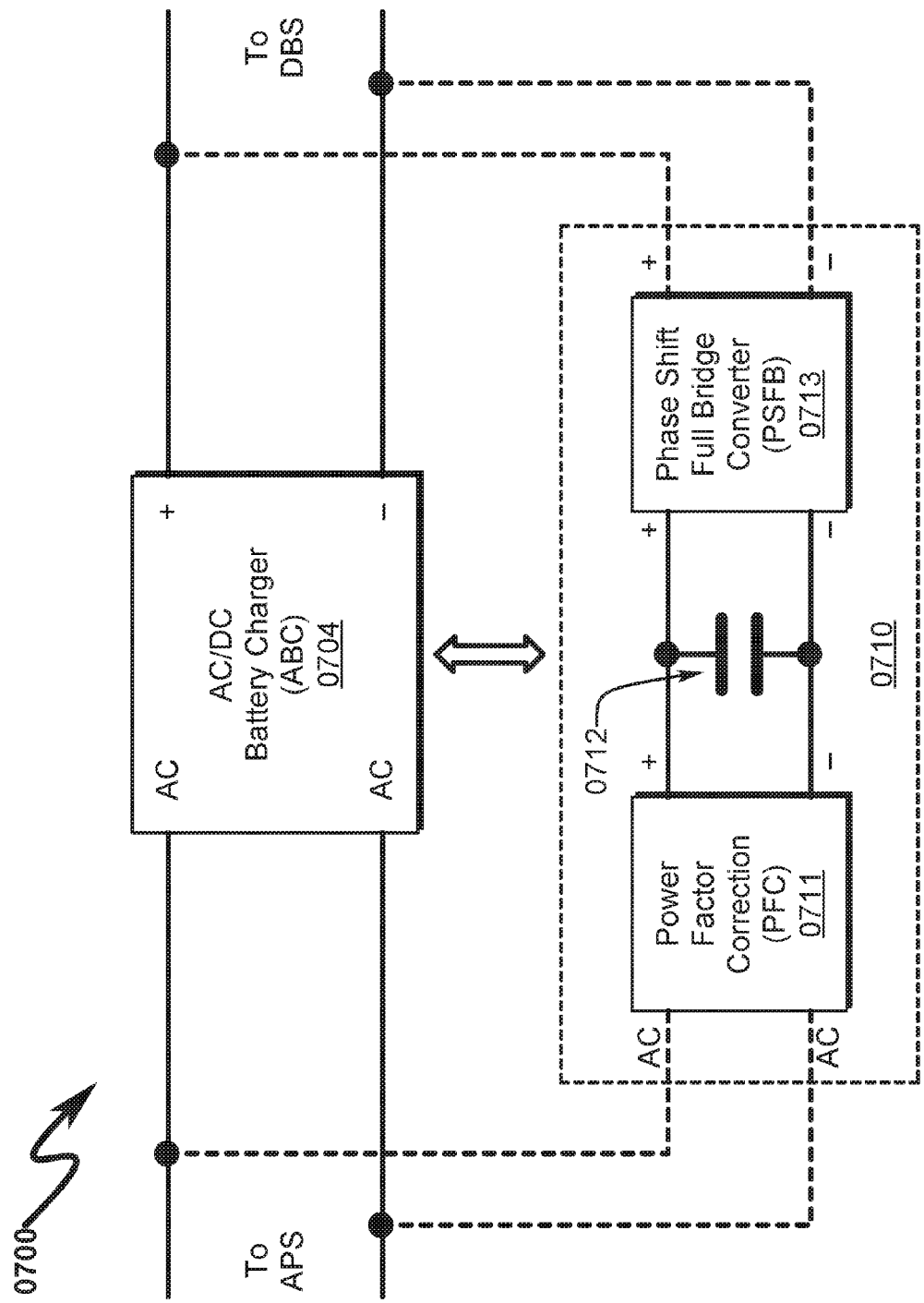
FIG. 7 illustrates a preferred exemplary AC/DC battery charger (ABC) embodiment useful in some preferred invention embodiments.

FIG. 7 (0700) depicts a preferred exemplary implementation of the AC/DC Battery Charger (ABC) (0710). The ABC (0710) module typically comprises a power factor correction (PFC) circuit (0701) that feeds a capacitor storage bus (0702) that provides power to a phase shift full bridge (PSFB) battery charger (0703) that serves to charge the DC power supply (DBS).

Switching Methodology Overview (0800)

Figure 8:
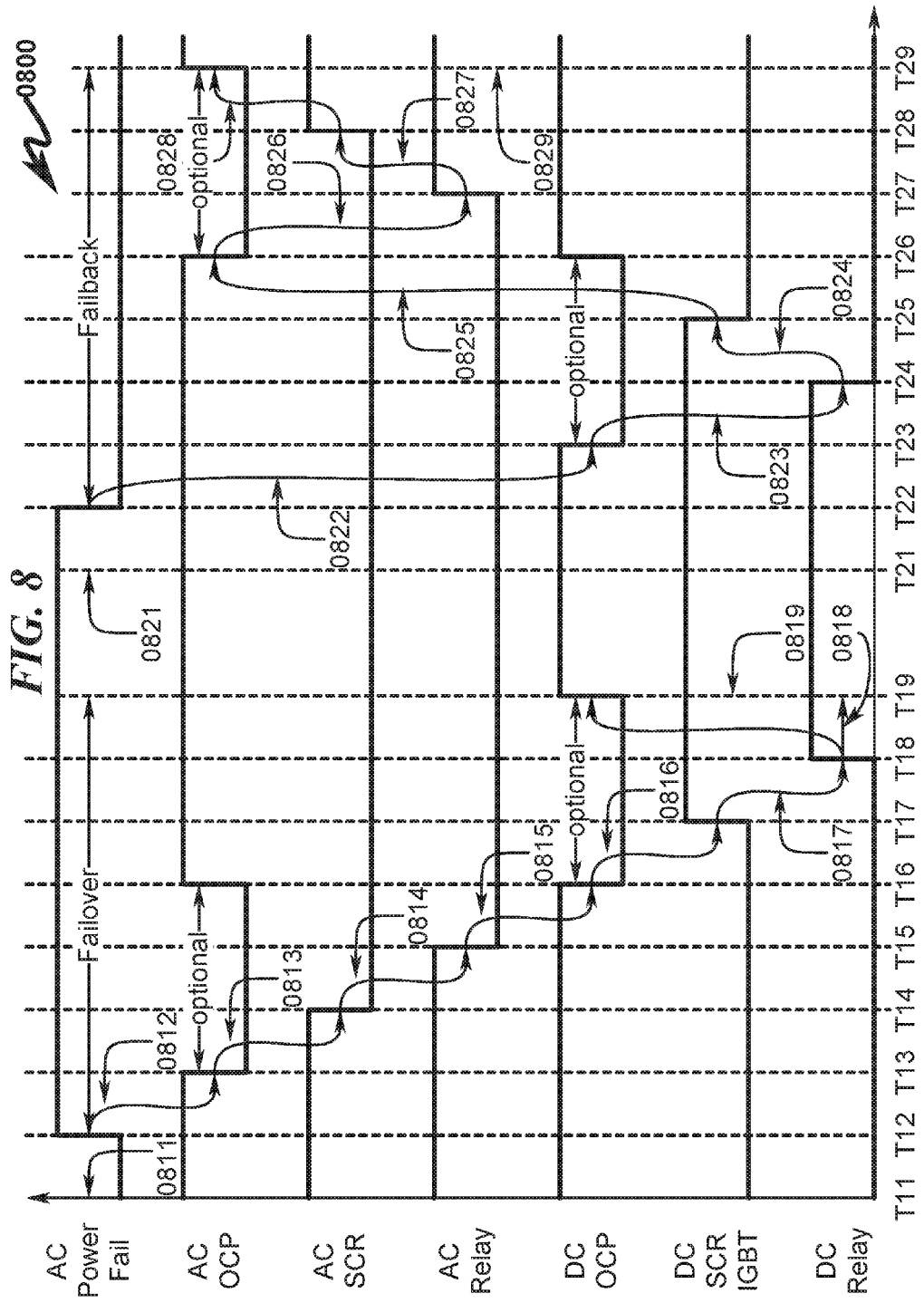
FIG. 8 illustrates a timing diagram useful in understanding the operational timing of some preferred invention embodiments.

The system context as depicted in FIG. 1 (0100) and FIG. 2 (0200) is typically associated with an overall switching methodology as depicted by the timing diagram in FIG. 8 (0800). Here the transitions between power supplied by the AC power source ACP and the DC battery source (DBS) are depicted.

ACP-to-DBS Transition Switching

Referencing FIG. 8 (0800), the transition between the ACP and DBS occurs as follows. At time T11 the system is depicted in a state where the FSC detects good power supplied by ACP (0811) before an ACP failure. At time T12 the FSC detects an ACP power failure and transitions (0812) to state T13 in which the AC overcurrent protection is temporarily disabled. Subsequent to this the FSC transitions (0813) to state T14 in which the AC SCR is disabled to break the connection between the ACP and the PLD. Subsequent to this FSC transitions (0814) to state T15 in which the AC relay is closed. The FSC then transitions (0815) to state T16 in which the DC overcurrent protection is temporarily disabled. After DC overcurrent protection is disabled the FSC transitions (0816) from state T16 to state T17 and closes the DC SCR and IGBT in the DC switch and battery isolation switch at time T17. Subsequent to the closing of the DC SCR and IGBT in the DC switch the DC relay is activated on transition (0817) from state T17 to state T18 so that power dissipation in the BIS SCR is minimized. By state T19 the system has transitioned (0818) to a stable state (0819) where PLD power is supplied by the DBS.

PBS-to-ACP Transition Switching

Referencing FIG. 8 (0800), the transition between the DBS and ACP occurs as follows. At time T21 the system is depicted in a state where the FSC detects good power supplied by DBS (0821) after an ACP failure. At time T22 the FSC detects good ACP power failure and initiates a DBS-to-ACP switchover and transitions (0822) to state T23 in which the DC overcurrent protection is optionally temporarily disabled. Subsequent to this the FSC transitions (0823) to state T24 in which the DC relay is disabled to prepare for opening of the DC SCR and DC IGBT. Subsequent to this FSC transitions (0824) to state T25 in which the DC IGBT and DC SCR are opened. The FSC then transitions (0825) to state T26 in which the AC overcurrent protection is optionally temporarily disabled. After AC overcurrent protection is optionally disabled the FSC transitions (0826) from state T26 to state T27 and closes the AC relay in the AC phase switch (ACS) at time T27. Subsequent to the closing of the AC phase switch (ACS) in the ACS the AC SCR is activated on transition (0827) from state T27 to state T28 to energize the PLD from the APS. By state T29 the system has transitioned (0828) to a stable state (0829) where PLD power is supplied by the APS.

Method Overview (0800)-(1200)

Figure 9:
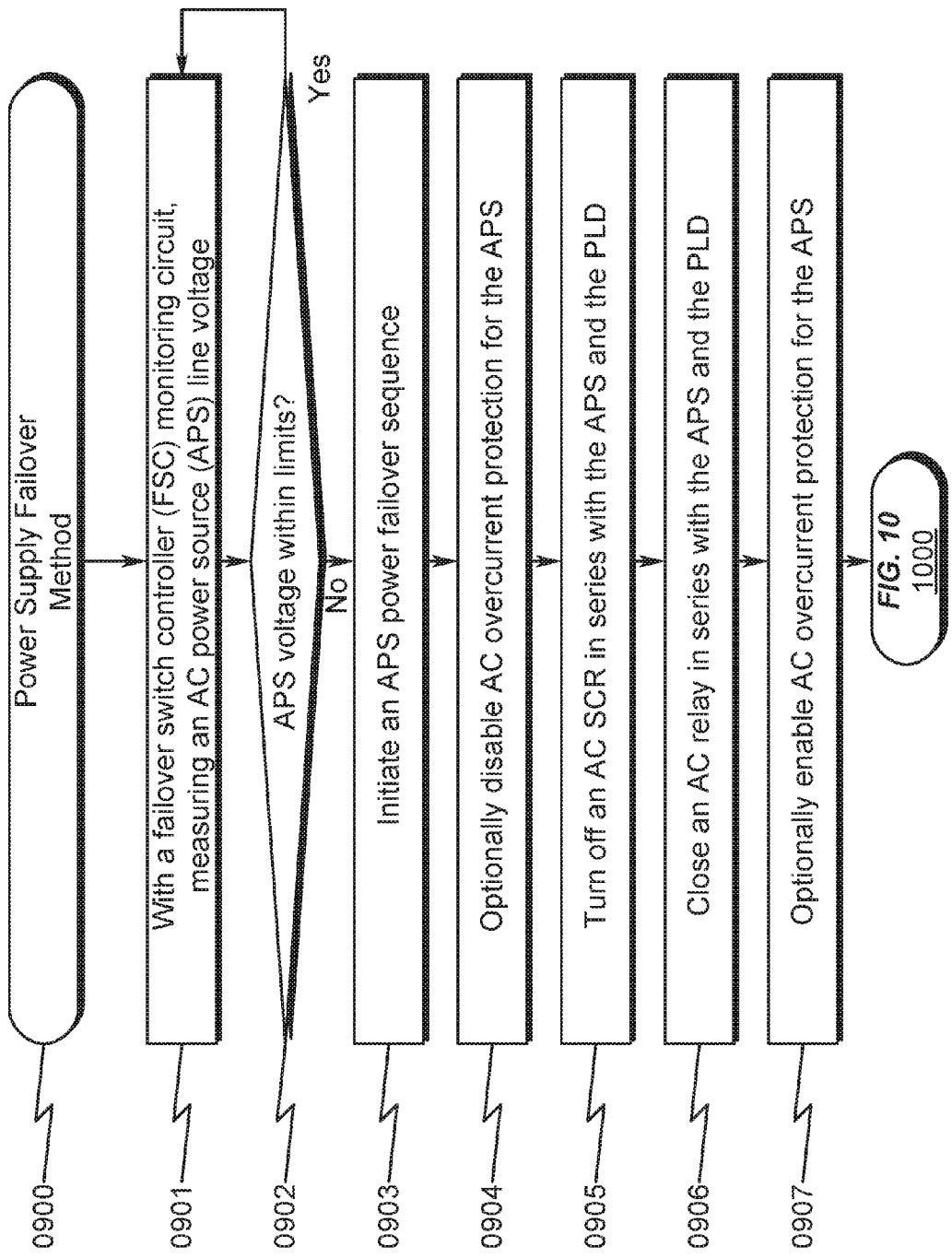
FIG. 9 illustrates a flowchart (1 of 4) depicting an exemplary power supply failover method embodiment.
Figure 10:
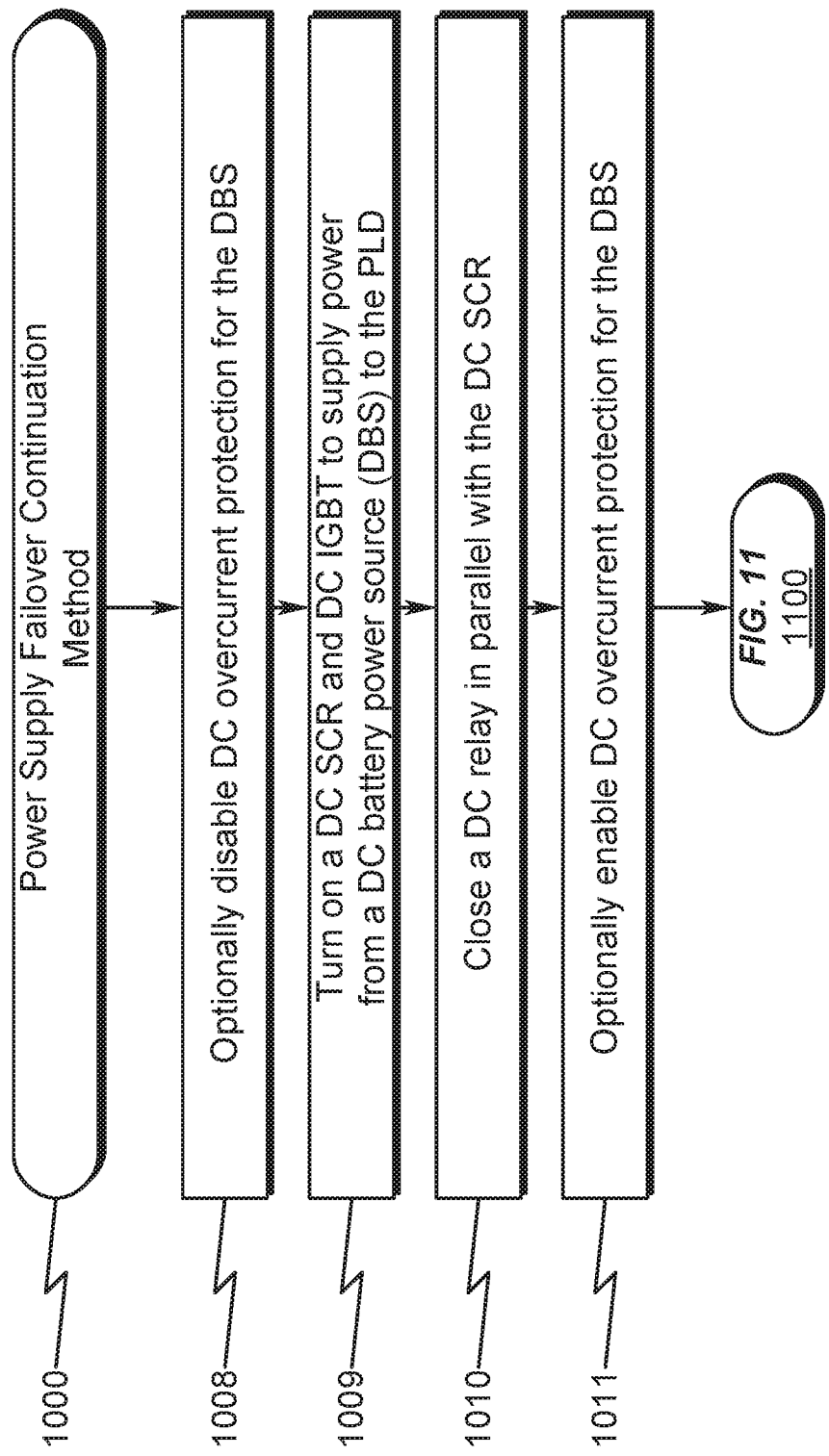
FIG. 10 illustrates a flowchart (2 of 4) depicting an exemplary power supply failover method embodiment.
Figure 11:
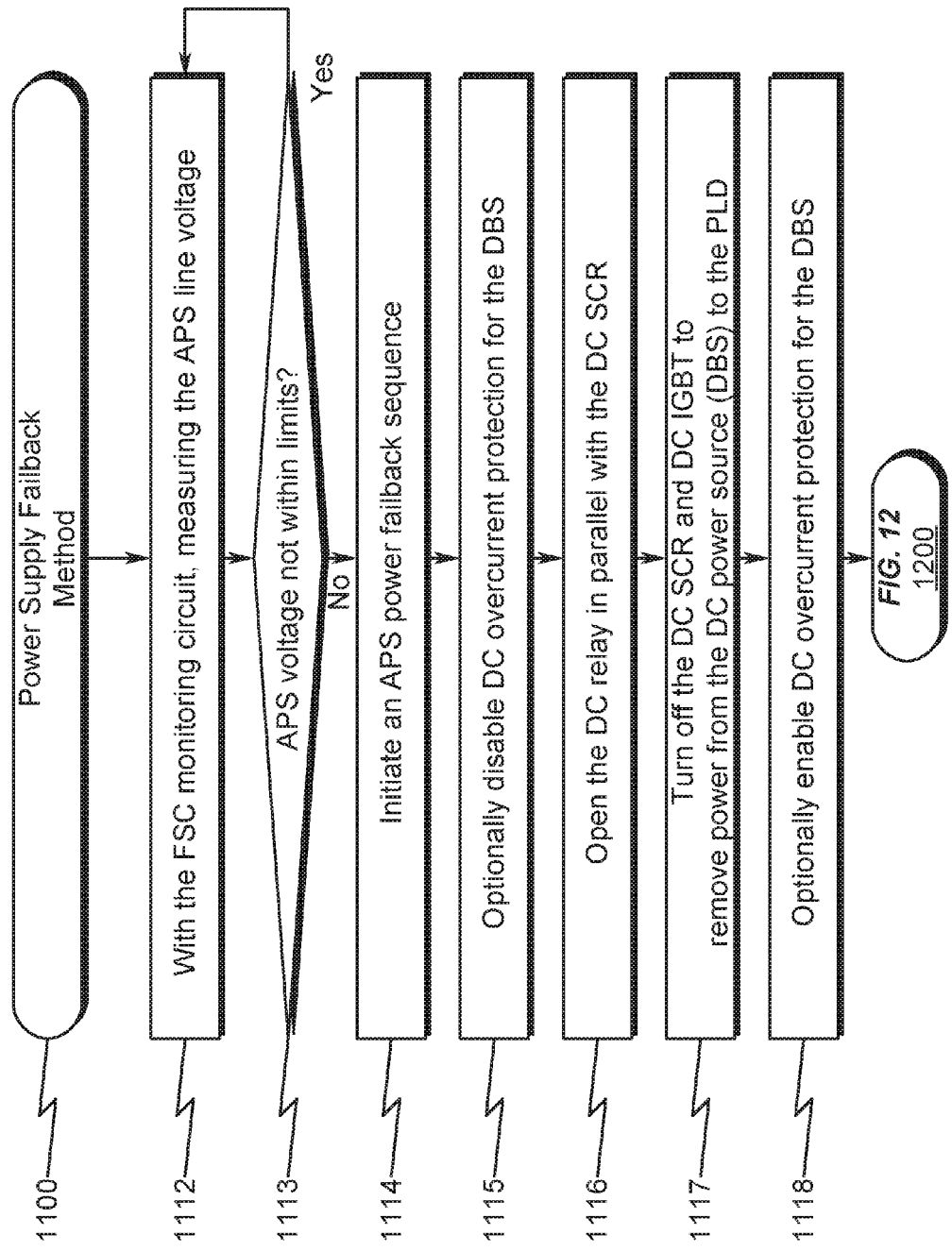
FIG. 11 illustrates a flowchart (3 of 4) depicting an exemplary power supply failback method embodiment.
Figure 12:
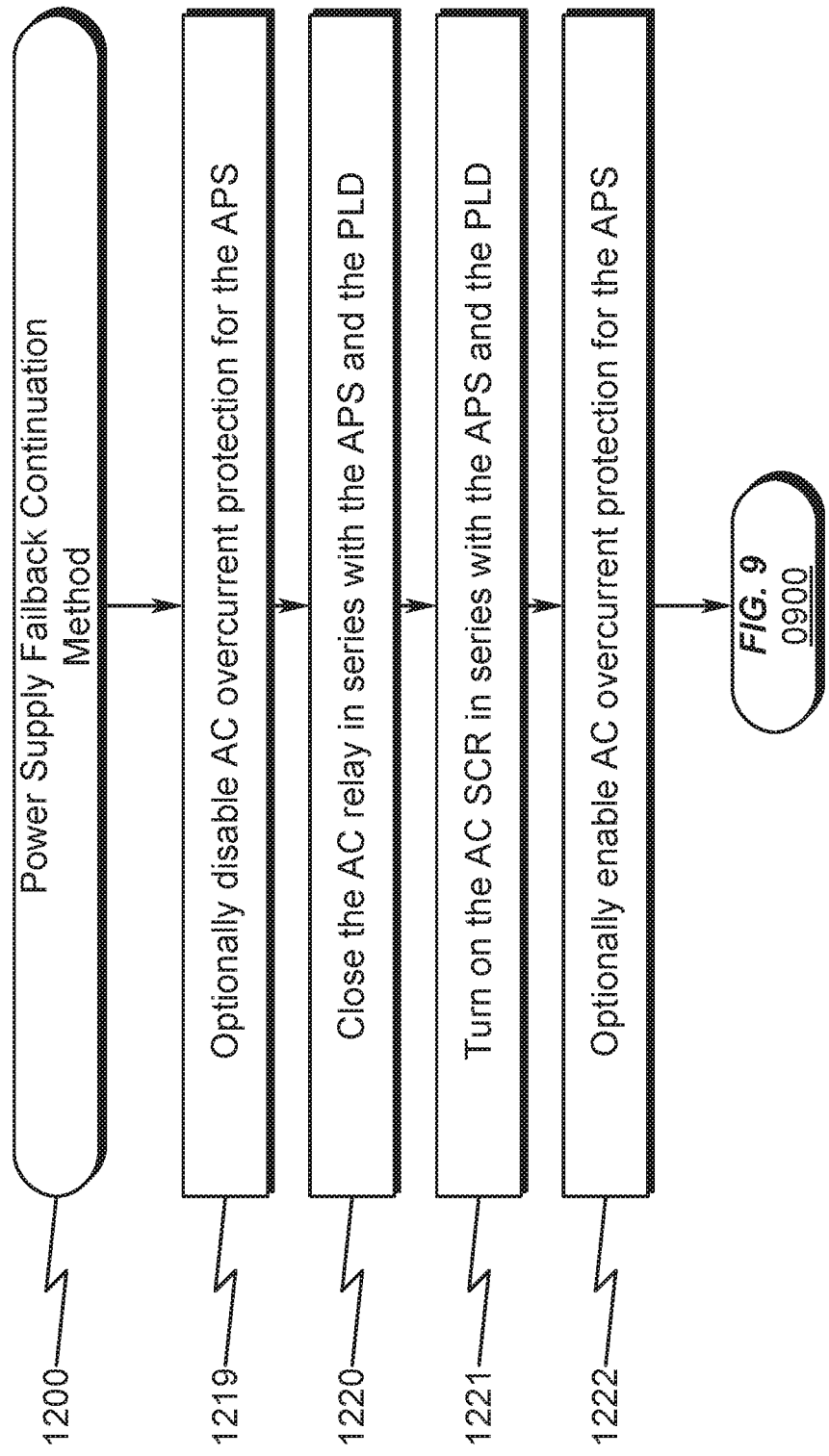
FIG. 12 illustrates a flowchart (4 of 4) depicting an exemplary power supply failback method embodiment.

The system context as depicted in FIG. 1 (0100) and FIG. 2 (0200) is typically associated with an overall APS-to-DBS and DBS-to-APS protected load device (PLD) power switching methodology as depicted in the timing diagram of FIG. 8 (0200) that is associated with the flowcharts depicted in FIG. 9 (0900)-FIG. 12 (1200) and involves the following steps:

(1) With a failover switch controller (FSC) monitoring circuit, measuring an AC power source (APS) line voltage (0901);
(2) If the APS line voltage is within limits, proceed to step (1) (0902);
(3) Initiate an APS power failover sequence (0903);
(4) Optionally disable AC overcurrent protection for the APS (0904);
(5) Turn off an AC SCR in series with the APS and the PLD (0905);
(6) Close an AC relay in series with the APS and the PLD (0906);
(7) Optionally enable AC overcurrent protection for the APS (0907);
(8) Optionally disable DC overcurrent protection for the DBS (1008);
(9) Turn on a DC SCR and DC IGBT to supply power from a DC battery power source (DBS) to the PLD (1009);

(10) Close a DC relay in parallel with the DC SCR (1010);
(11) Optionally enable DC overcurrent protection for the DBS (1011);
(12) With the FSC monitoring circuit, measuring the APS line voltage (1112);
(13) If the APS line voltage is not within limits, proceed to step (12) (1113);
(14) Initiate an APS power failback sequence (1114);
(15) Optionally disable DC overcurrent protection for the DBS (1115);
(16) Open the DC relay in parallel with the DC SCR (1116);
(17) Turn off the DC SCR and DC IGBT to remove power from the DC power source (DBS) to the PLD (1117);
(18) Optionally enable DC overcurrent protection for the DBS (1118);
(19) Optionally disable AC overcurrent protection for the APS (1219);
(20) Close the AC relay in series with the APS and the PLD (1220);
(21) Turn on the AC SCR in series with the APS and the PLD (1221);
(22) Optionally enable AC overcurrent protection for the APS and proceed to step (1) (1322).

One skilled in the art will recognize that these method steps may be augmented or rearranged and some steps may be added or omitted without limiting the teachings of the present invention. This general method overview may be augmented by the various elements described herein to produce a wide variety of invention embodiments consistent with this overall design description.

Power Failover/Failback Switching (1300)

Figure 13:
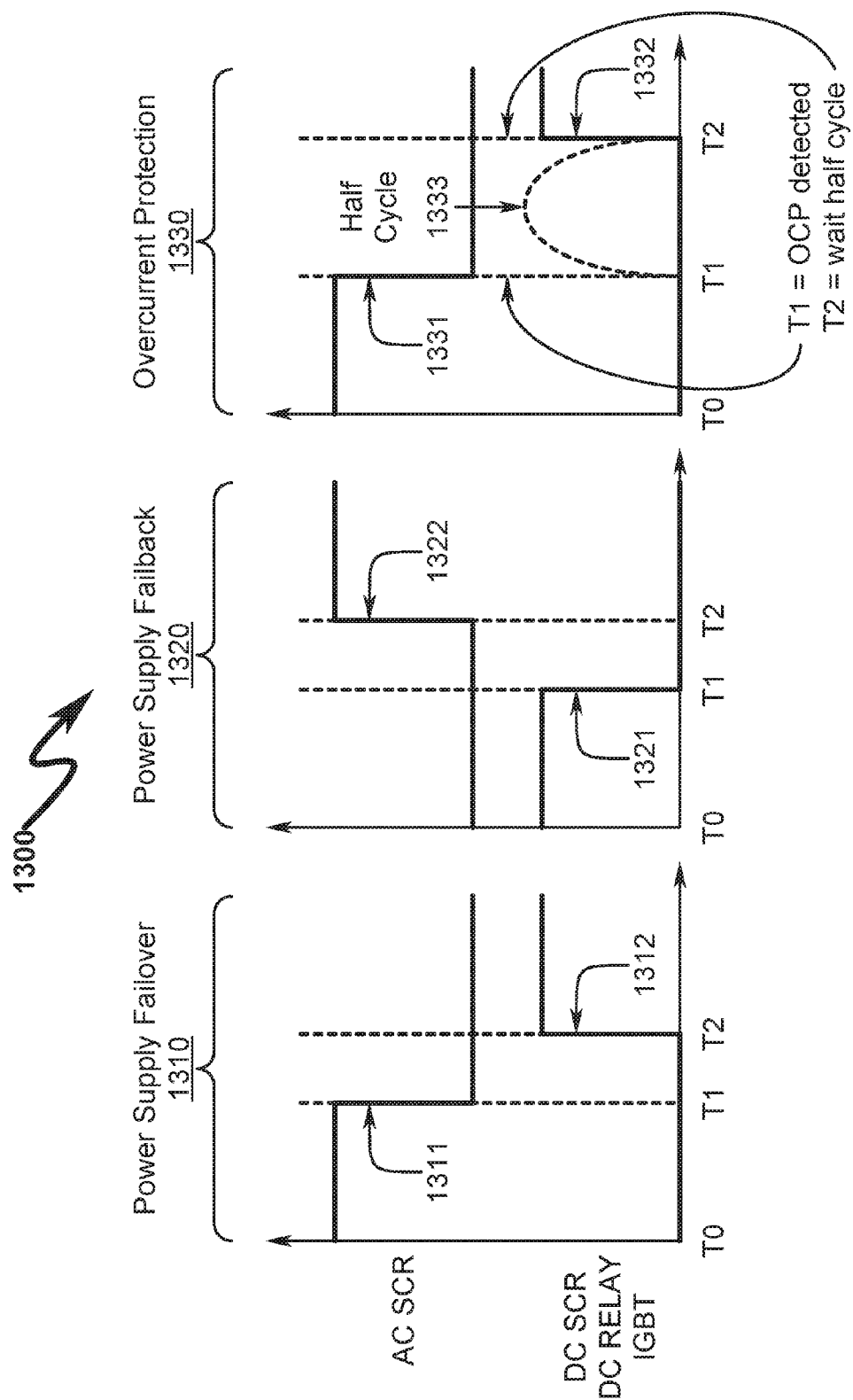
FIG. 13 illustrates a timing diagram useful in understanding the failover, failback and overcurrent protection operational timing of some preferred invention embodiments.

An overview of the present invention power failover/failback and overcurrent functionality is depicted in FIG. 13 (1300). These graphs depict the relative switch timing associated with a power failover (1310) in which DC backup power replaces an AC source, power failback (1320) in which an AC source replaces a DC backup supply, and situations in which overcurrent protection (1330) is initiated to ensure that failover/failback transitions do not trip overcurrent protection breakers.

Within the context of a power supply failover (1310), the present invention initiates a break-before-make switch between the AC SCR (1311) to DC SCR/RELAY/IGBT (1312). This delay attempts to prevent an overcurrent condition associated with connection of the DC backup source to the protected load device (PLD) AC+DC power supply.

Similarly, in the context of a power supply failback (1320), the present invention initiates a break-before-make switch between the DC SCR/RELAY/IGBT (1321) to AC SCR (1322). This delay attempts to prevent an overcurrent condition associated with connection of the AC source (1322) to the protected load device (PLD) AC+DC power supply in which capacitors in the AC+DC power supply (1321) backrush current to the AC source on activation of the AC SCR (1322).

Inhibiting of overcurrent protection (1330) optionally takes place during a transition region between failover/failback that comprises the transition period between AC sourcing (1331) and DC backup supply (1332) for a nominal period of one half AC cycle (1333). This transition region may occur between the failover transition as depicted or in the reverse situation for failback. The behavior as depicted in (1330) is that after inner shorting OCP has occurred (APS and DBS are shorting together at the same time point) and not the transition of failback. DC OCP is nominally disabled for approximately 1.3 ms when transitioning from AC to DC power. When inner shorting OCP has occurred (may be a SCR shorting fault) and in order to keep output power uninterrupted, AC/bypass mode is disabled and the system will wait one-half cycle to transition to DC mode. This ensures that the AC relay/bypass relay has sufficient time to completely turn off and disconnect the relay contacts. In each case the overcurrent protection breakers in the system may be inhibited for a short period of time (one-half AC cycle period) in order to permit the transition power connections to be made or broken. Due to capacitor loading in the AC+DC power supply when the DC backup supply is connected, these overcurrent breakers may trip unless inhibited during this transition period. Similarly, when the AC supply is restored during a failback transition, charge from the AC+DC PLD supply may backrush into the AC supply or the capacitors in the AC+DC PLD supply may be charged to a level that requires significant inrush currents from the AC supply. Without the inhibition of the AC supply overcurrent breakers during this transition period, the breakers may inadvertently trip causing an overall system power failure.

Multi-Switch Redundancy

The present invention anticipates that some switching elements in the present invention may fail in either an open or shorted condition. In anticipation of these failures, the present invention utilizes multi-switch redundancy. This multi-switch redundancy has several objectives. First, it is capable of removing switch paths that have failed due to a shorted switching component. Second, it is capable of bypassing a switching element having a higher resistance and/or power dissipation with a switching element having a lower resistance and/or power dissipation.

Within this context semiconductor devices may be placed in series with relays or IGBTs to provide a secondary method to disconnect the current path if the semiconductor device becomes shorted or fails catastrophically. Furthermore, it may be possible to shunt a semiconductor device with a relay to eliminate the ON resistance of the semiconductor device during times of conduction. An example of this is shunting an SCR with a DC relay that is activated AFTER the SCR is activated and deactivated BEFORE the SCR is deactivated. In this manner ON/OFF transition current spikes that would normally degrade contacts in a mechanical relay contactor are eliminated by the break-before-make operation of the SCR and relay.

Power Supply Failover/Failback Control Method (1400)

Figure 14:
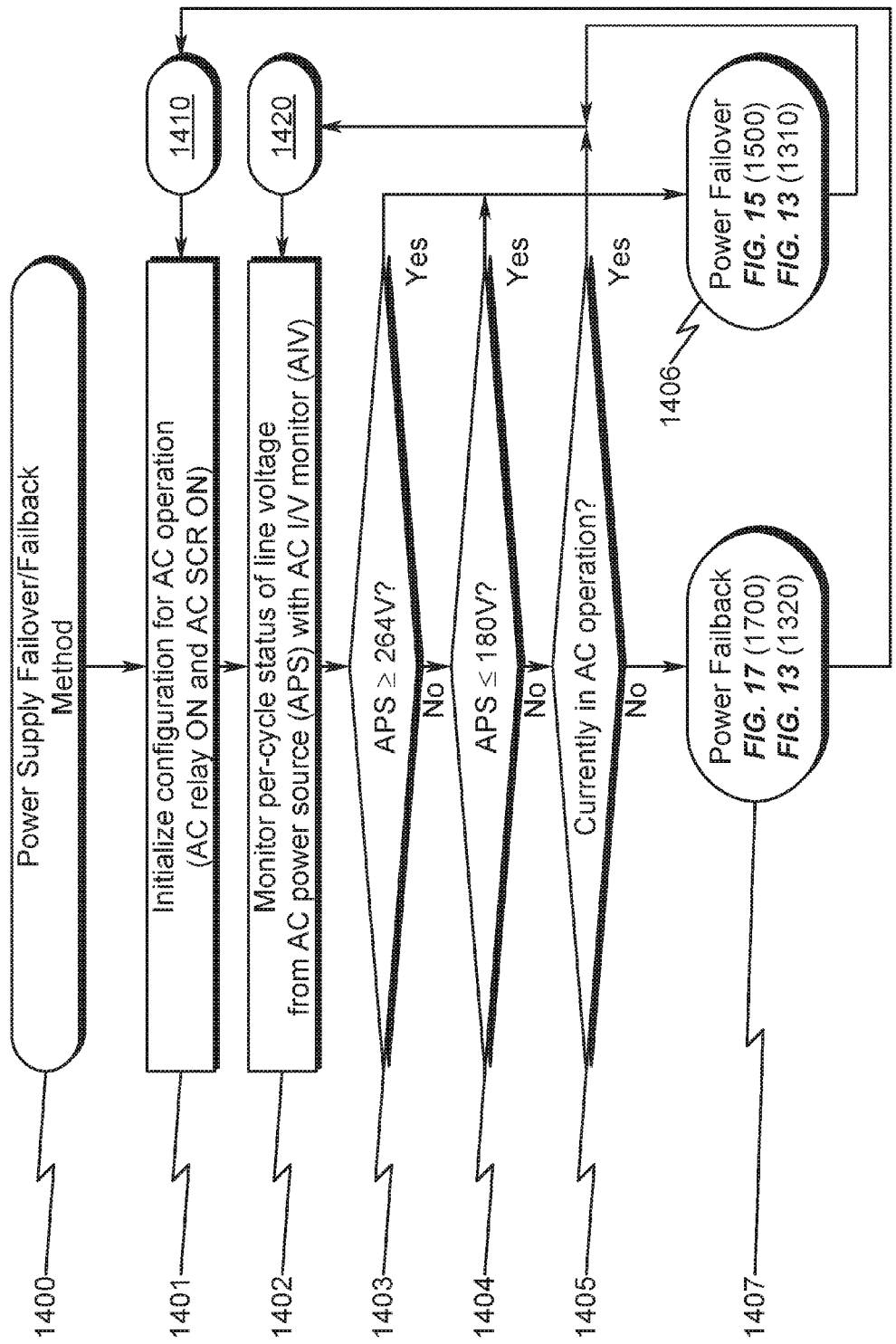
FIG. 14 illustrates a flowchart depicting an exemplary power supply failover/failback overview method.
Figure 15:
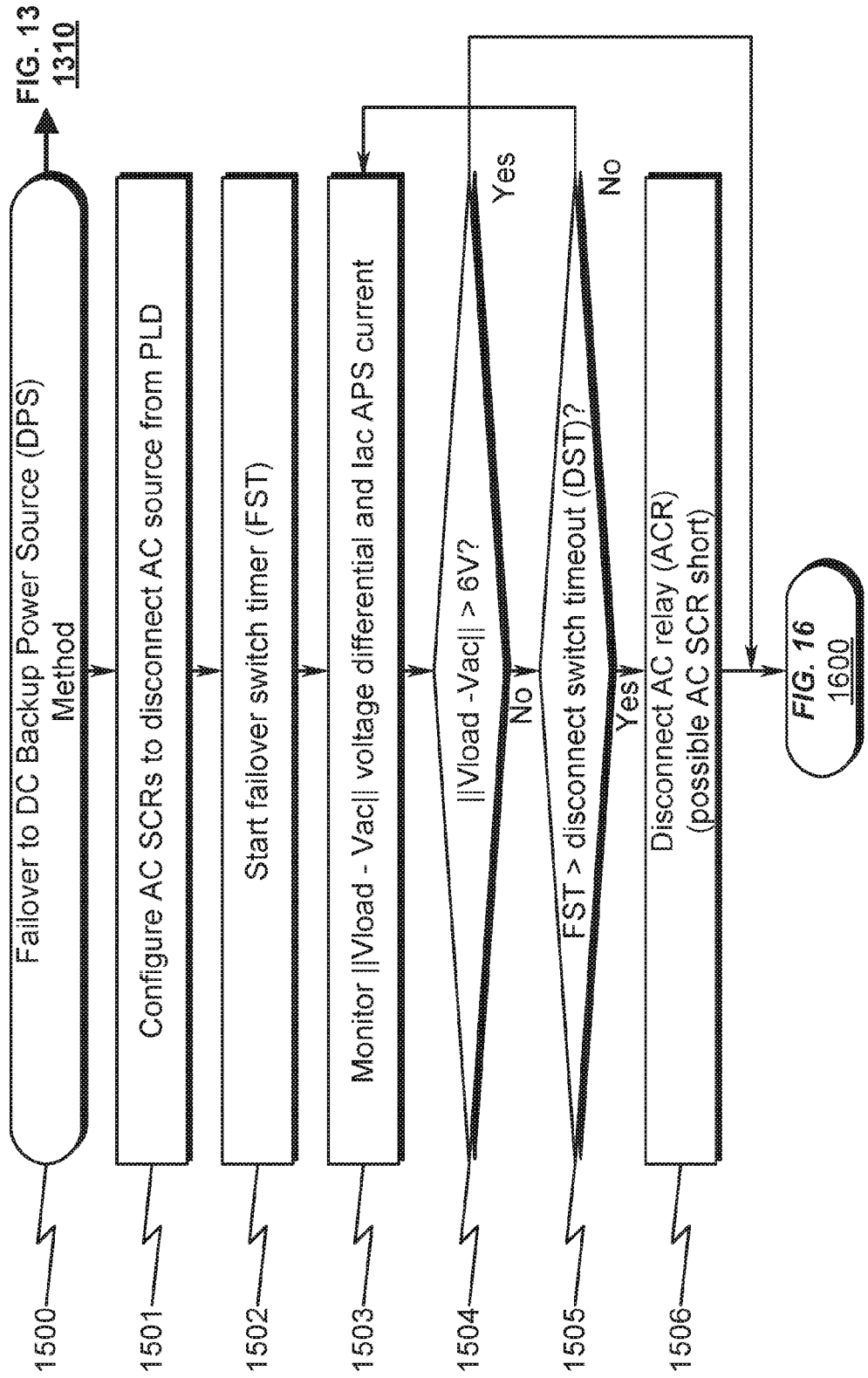
FIG. 15 illustrates a flowchart depicting an exemplary failover to DC backup power source (DPS) method.
Figure 16:
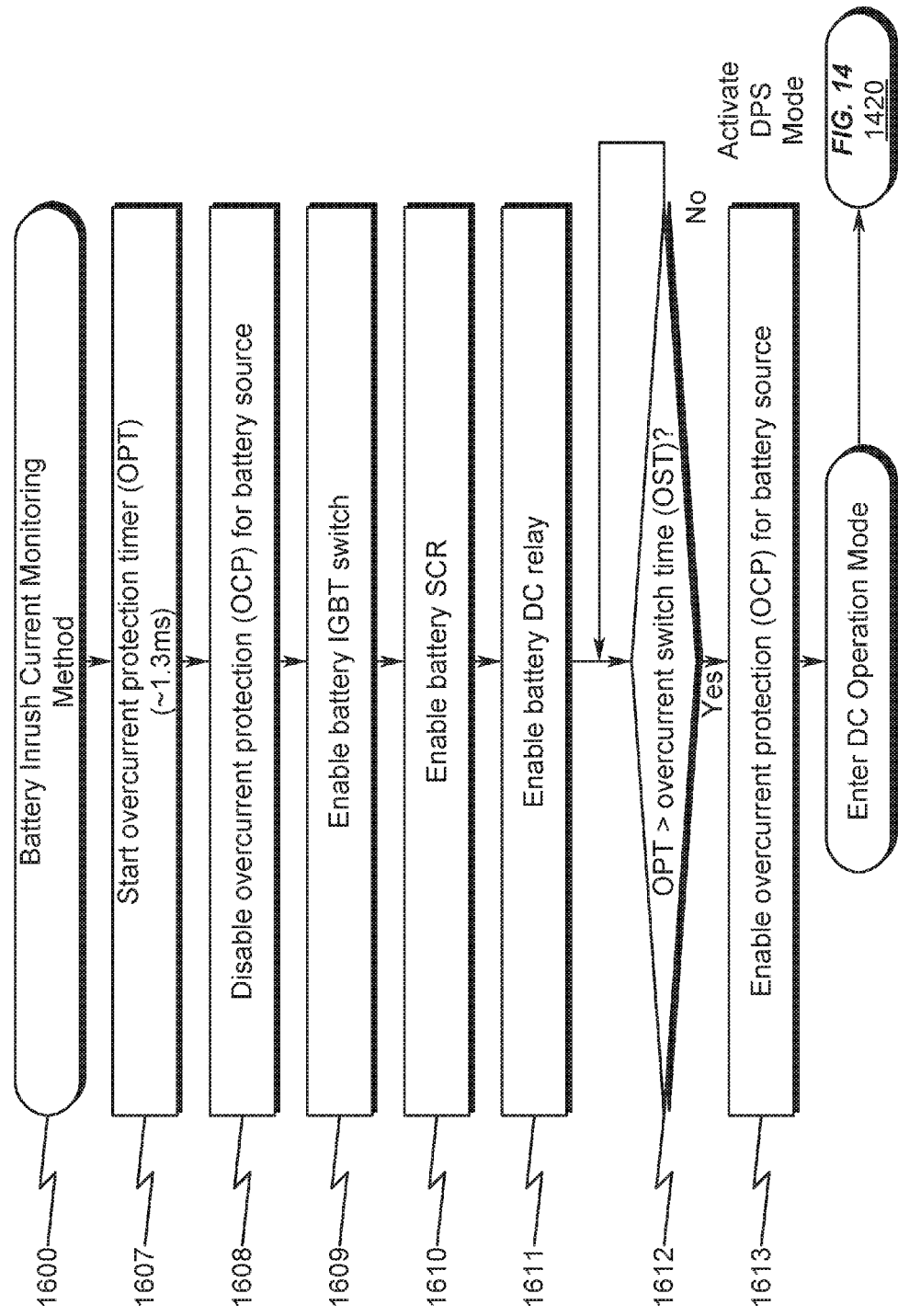
FIG. 16 illustrates a flowchart depicting an exemplary battery inrush current monitoring method.
Figure 17:
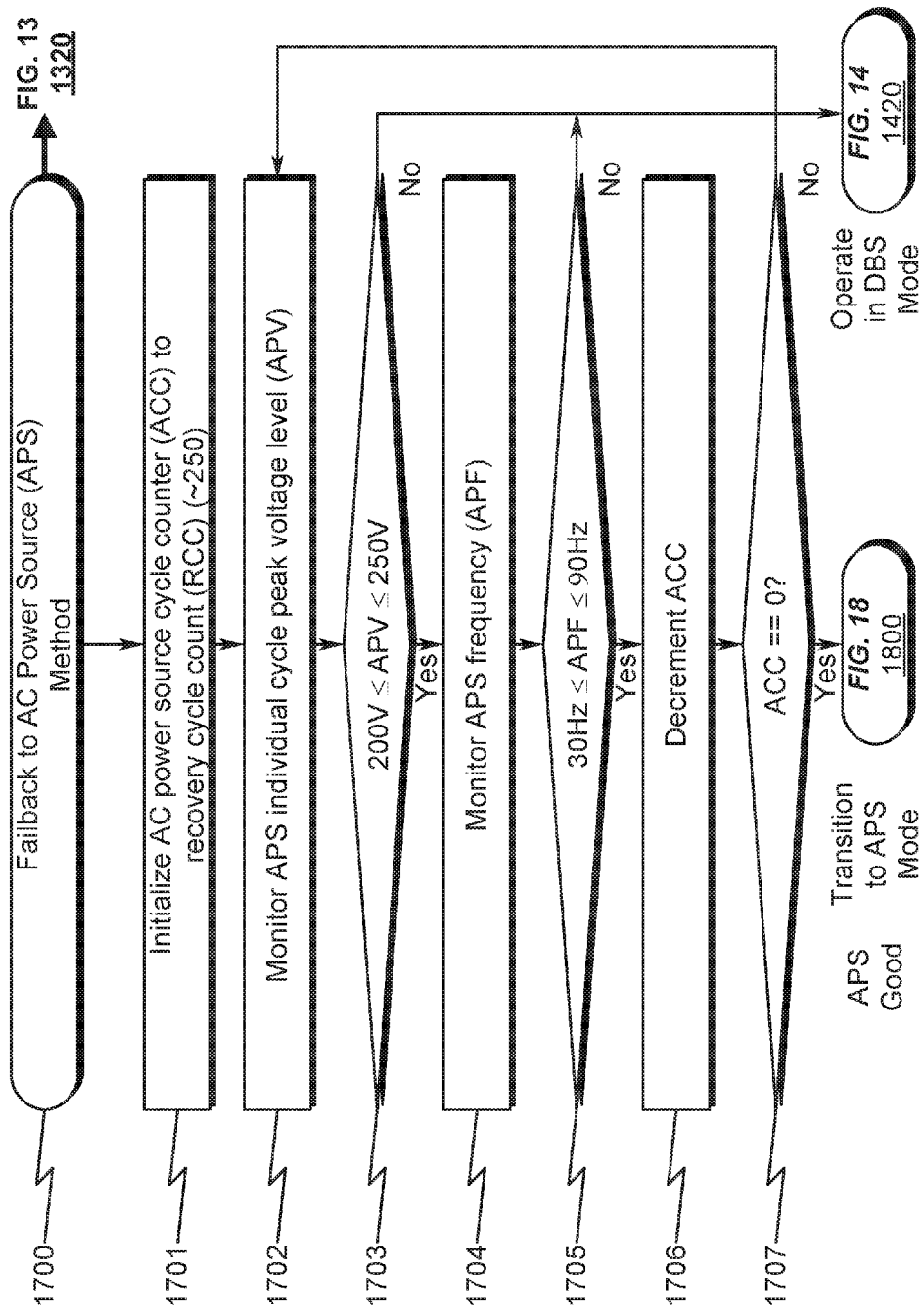
FIG. 17 illustrates a flowchart depicting an exemplary failback to AC power source (APS) method.
Figure 18:
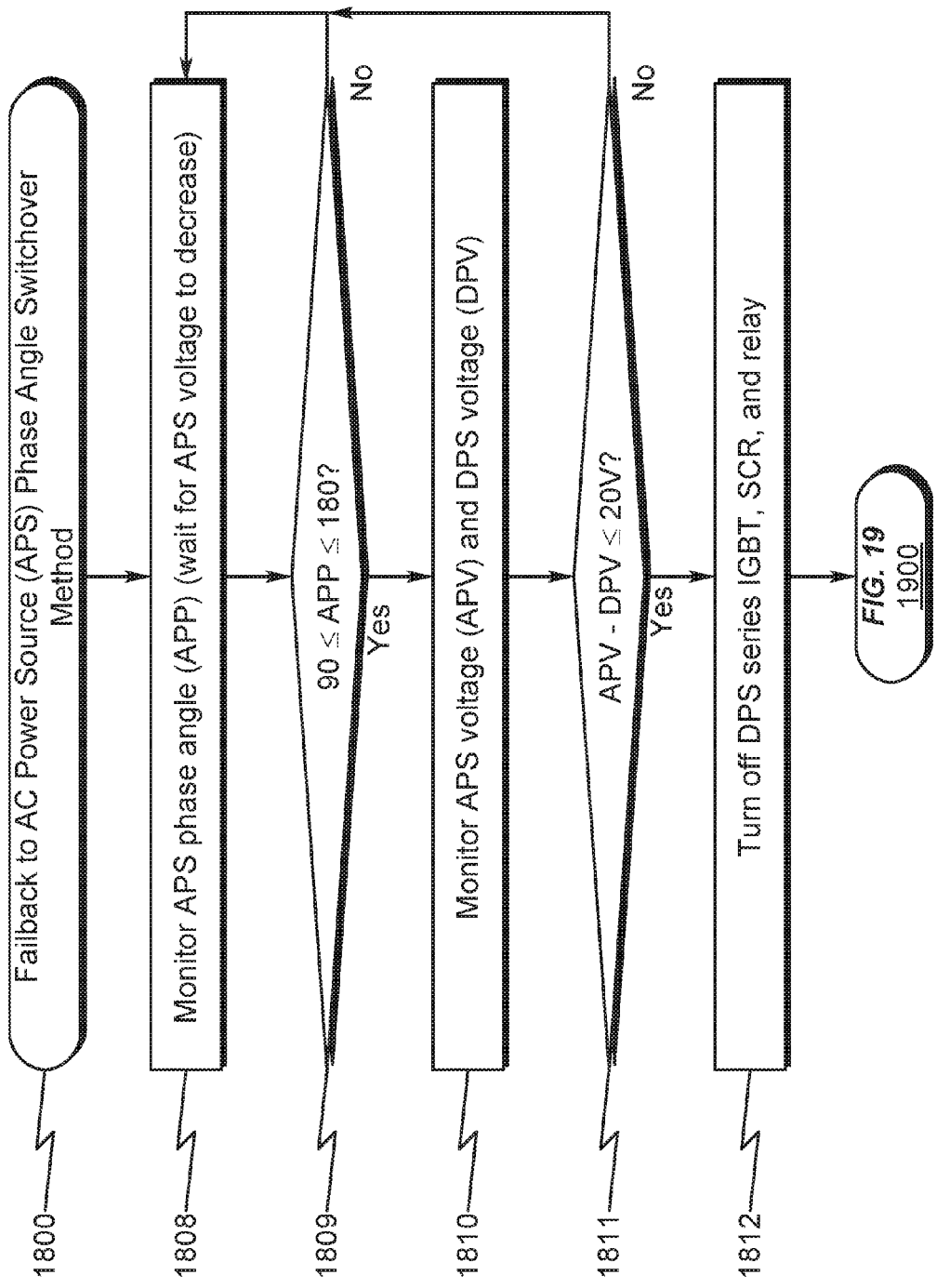
FIG. 18 illustrates a flowchart depicting an exemplary failback to AC power source (APS) phase angle switchover method.
Figure 20:
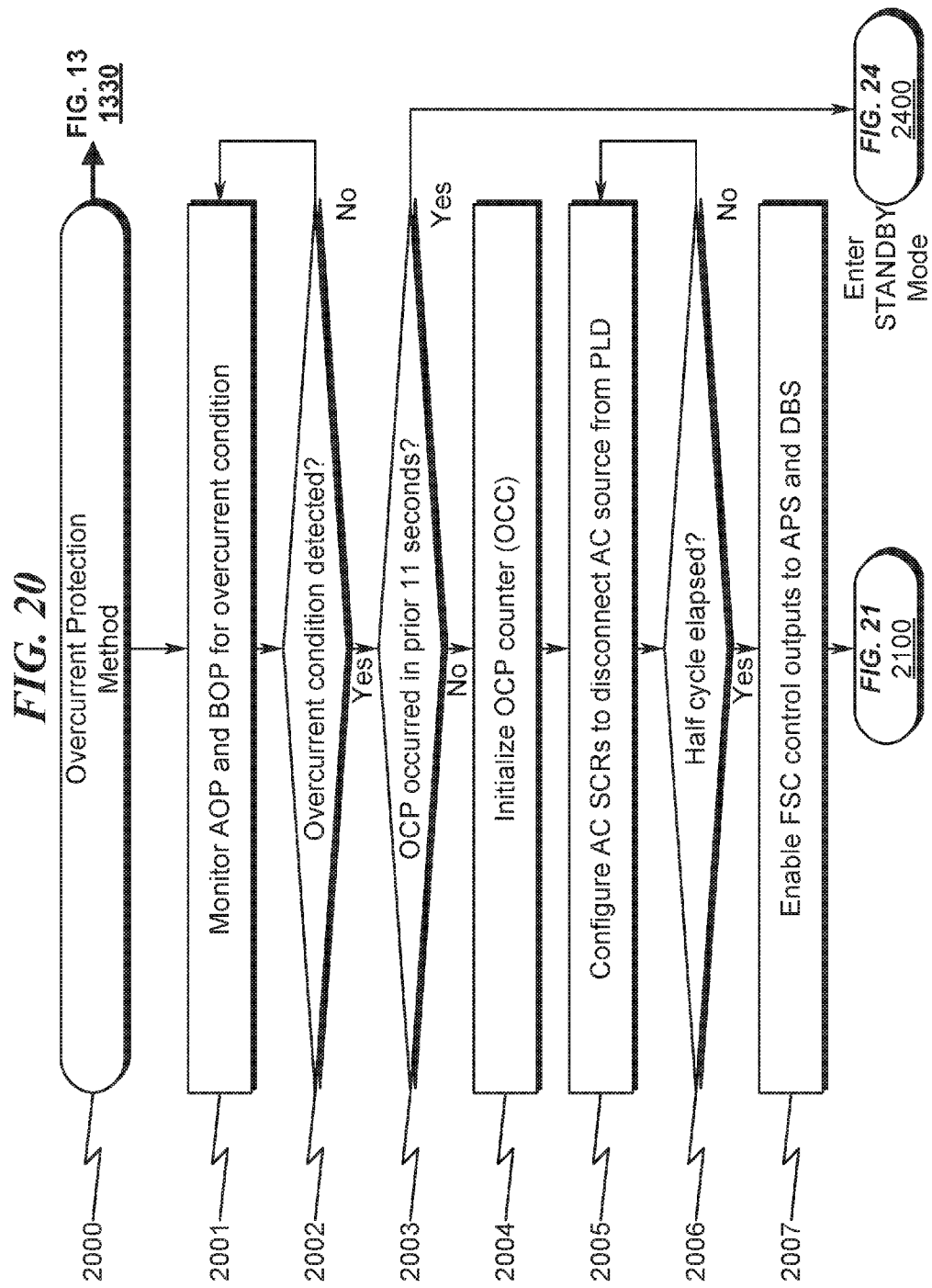
FIG. 20 illustrates a flowchart (1 of 5) depicting an exemplary overcurrent protection (OCP) method.
Figure 21:
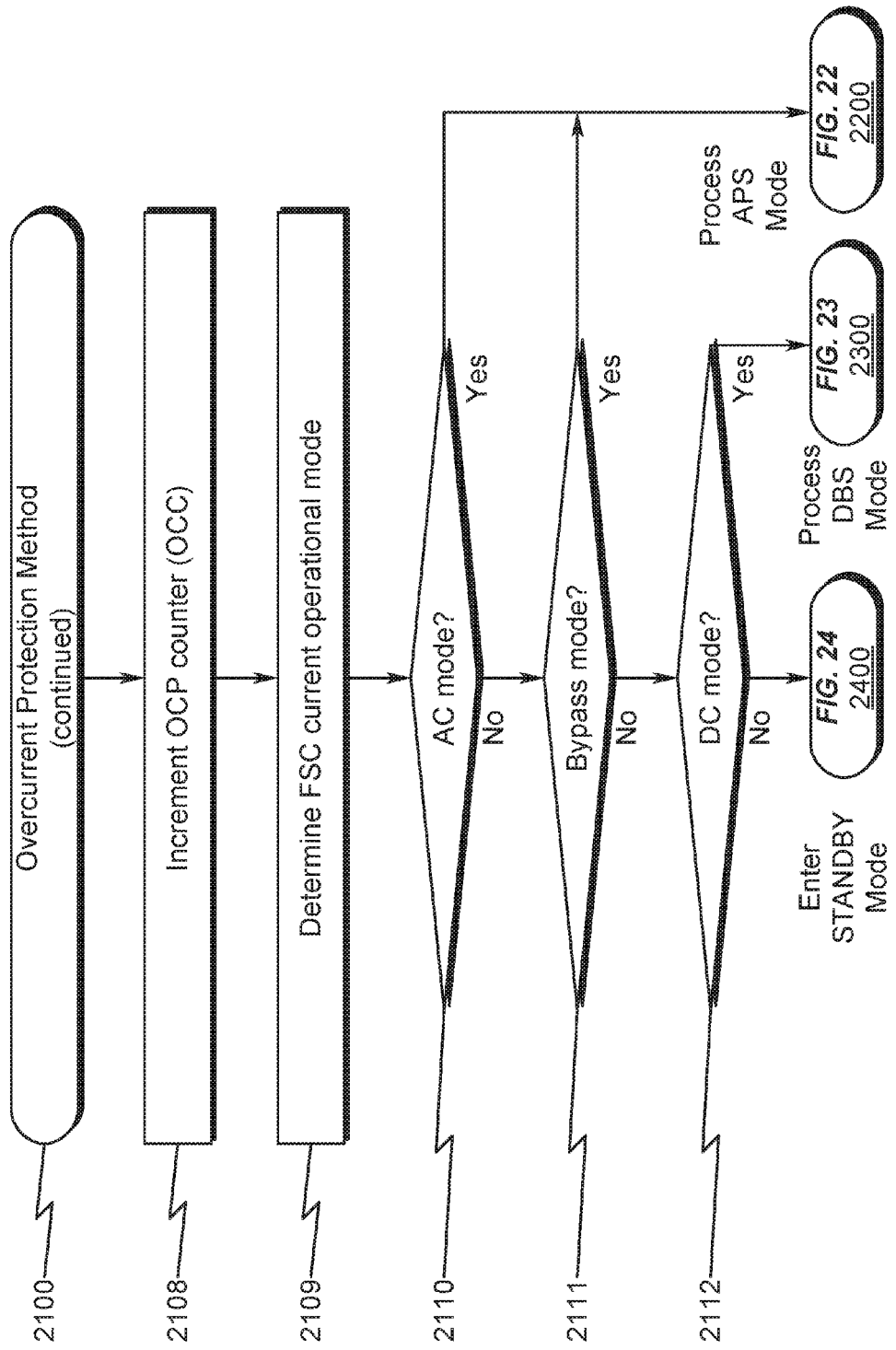
FIG. 21 illustrates a flowchart (2 of 5) depicting an exemplary overcurrent protection (OCP) method.
Figure 22:
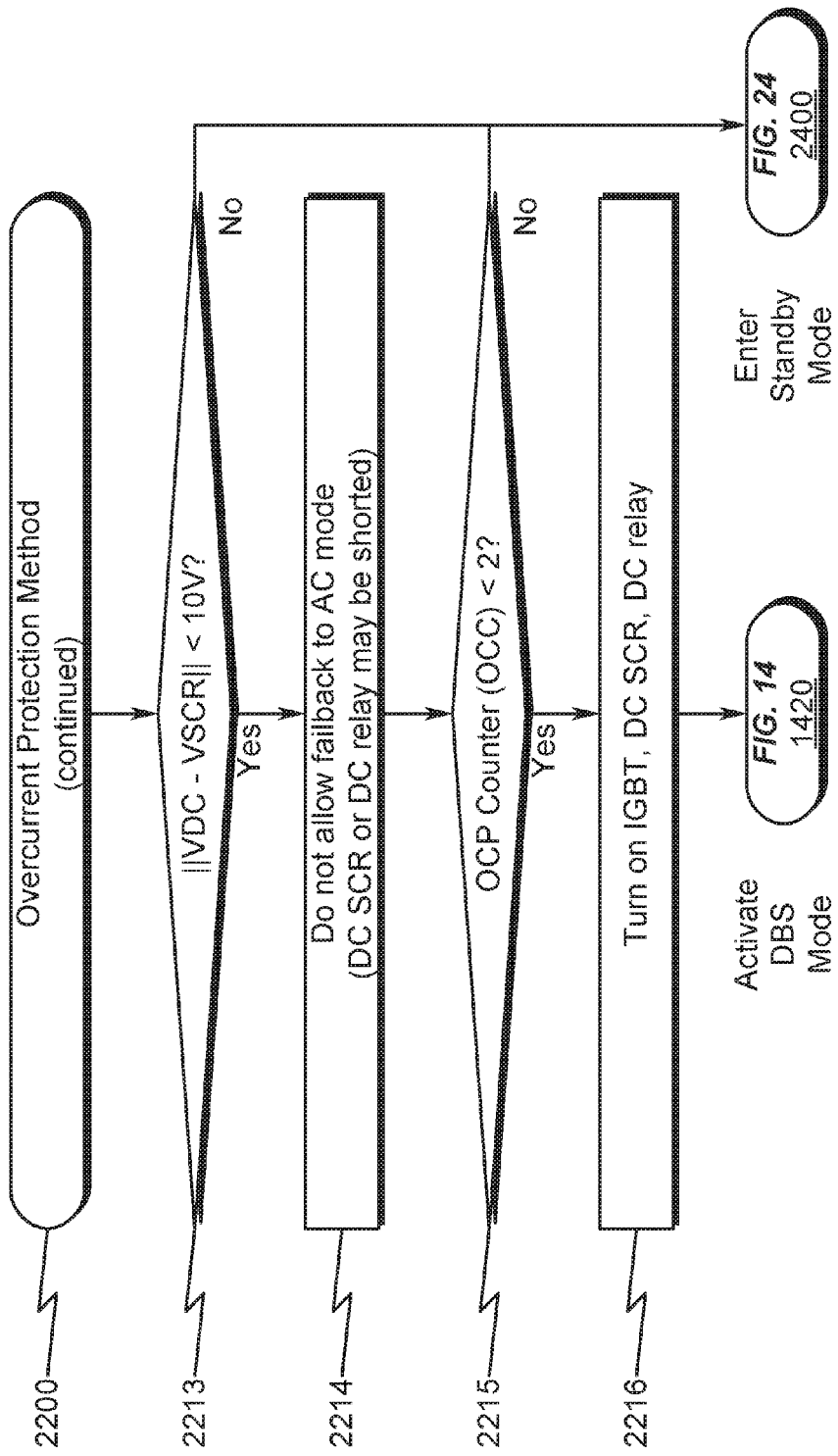
FIG. 22 illustrates a flowchart (3 of 5) depicting an exemplary overcurrent protection (OCP) method.
Figure 23:
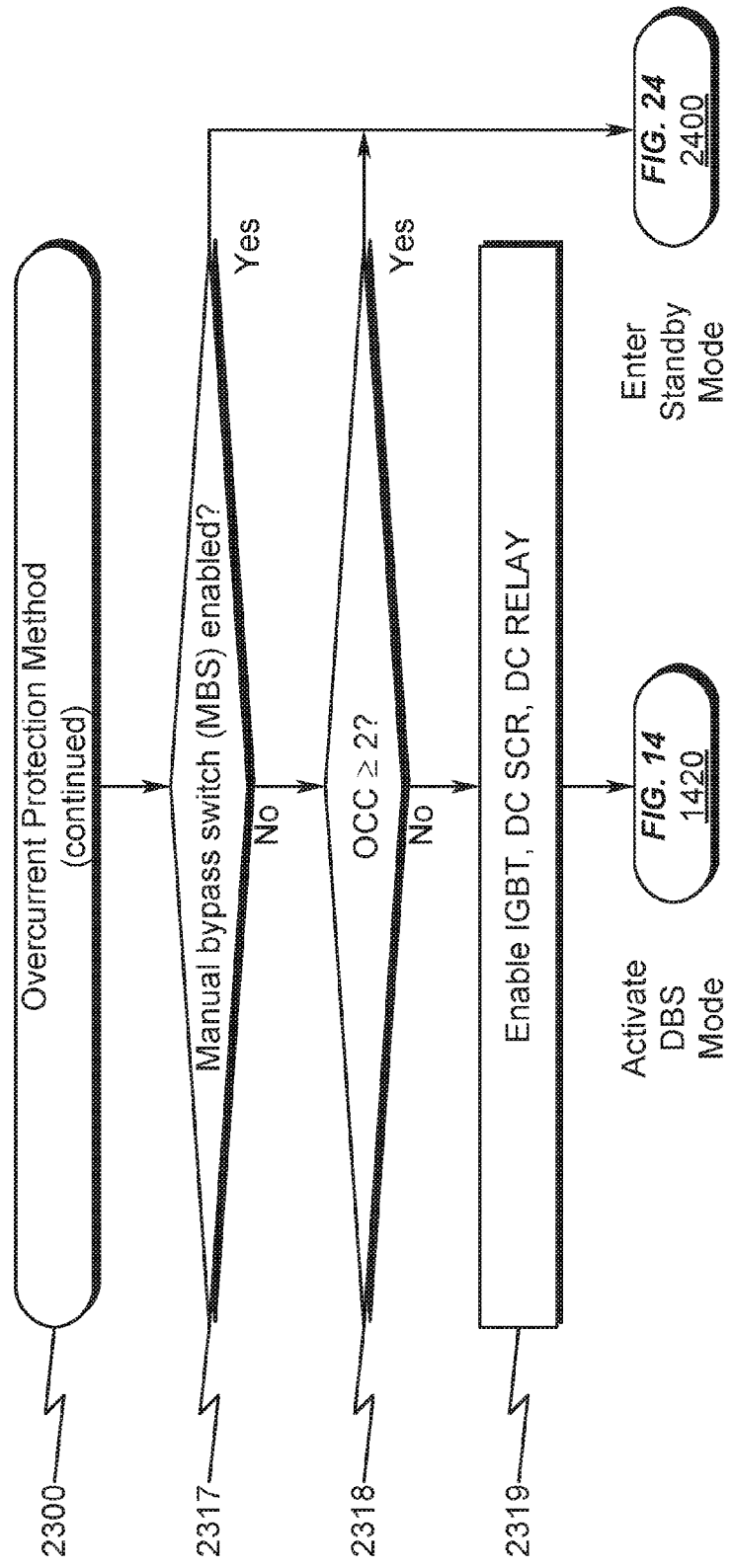
FIG. 23 illustrates a flowchart (4 of 5) depicting an exemplary overcurrent protection (OCP) method.

A general overview of the present invention power supply failover/failback overall control method is depicted in the flowchart of FIG. 14 (1400) involves the following steps:
(1) Initially configuring the power supply failover system for AC operation with a series AC relay and AC SCR combination ON to electrically couple an AC power source (APS) to the a protected load device (PLD) (1401);
(2) With a voltage monitoring circuit, monitoring the status of the line voltage from the APS (1402);
(3) Determining if the APS voltage is greater than or equal to 264V, and if so, proceeding to step (6) (1403);
(4) Determining if the APS voltage is less than or equal to 180V, and if so, proceeding to step (6) (1404);

(5) Determining if AC operation is currently in effect (with the APS connected to the PLD), and if so, proceeding to step (2), otherwise proceeding to step (7) (1405);

(6) Activating a power failover method (corresponding to implementation of the signal diagram (1310) in FIG. 13 (1300) and generally depicted in FIG. 15 (1500)-FIG. 16 (1600)) to switch between AC power from the APS and DC backup power from a DC power source (DBS) and proceeding to step (2) (1406); and (7) Activating a power failback method (corresponding to implementation of the signal diagram (1320) in FIG. 13 (1300) and generally depicted in FIG. 17 (1700)-FIG. 20 (2000)) to switch between DC backup power from the DBS and AC power from the APS and proceeding to step (1) (1407).

One skilled in the art will recognize that these method steps may be augmented or rearranged and some steps may be added or omitted without limiting the teachings of the present invention. This general method overview may be augmented by the various elements described herein to produce a wide variety of invention embodiments consistent with this overall design description.

The overall power supply failover/failback control loop is configured to connect the APS to the PLDs unless the APS is out of range, in which case the DBS provides power to the PLDs by activating the IGBT, DC SCR, and DC relay. Further details of the failover/failback control system is depicted in the flowcharts of FIG. 15 (1500)-FIG. 14 (1400).

Power Supply Failover Method (1500)-(1600)

An exemplary embodiment of a present invention power supply failover method (corresponding to the AC-to-DC switch failover timing diagram (1310) of FIG. 13 (1300)) that switches from an AC power source (APS) to DC battery backup power source (DBS) is depicted in the flowcharts of FIG. 15 (1500)-FIG. 16 (1600) and involves the following steps:

(1) AC SCRs are configured to disconnect the AC power source (APS) from the PLD (1501);

(2) Starting a failover switch timer (FST) (this timer typically counts 15 intervals of 67 microseconds (or approximately 1 ms) to determine the point at which the APS has fully disconnected from the PLD) (1502);

(3) Monitoring the absolute ||Vload−Vac|| voltage differential and/or the Iac APS current to determine when the APS has ceased supplying power to the PLD or a suitable transition point has been reached (1503);

(4) Determining if ||Vload−Vac|| is greater than or equal to 6V, and if so, proceeding to step (7) (1504);

(5) Determining if the FST has exceeded the disconnect switch timeout (DST), and if not, proceeding to step (3) (1505);

(6) Disconnecting the AC relay (ACR) to remedy a possible AC SCR short condition (1506) (because it could not be determined that the AC SCR has been verified as disconnected—this ensures that the AC source is not shorted to the DC source when in DC backup mode);

(7) Starting an overcurrent protection timer (OPT) (1607) (this inhibits OCP protection during the transition to the DC battery power source (DBS));

(8) Disabling overcurrent protection (OCP) for the DC battery power source (DBS) (1608);

(9) Enabling the DBS IGBT switch (1609);

(10) Enabling the DBS SCR (1610);

(11) Enabling the DBS DC relay (1611);

(12) Determining if the OCP timer count is greater than the overcurrent switch time (OST), and if not, proceeding to step (12) (1612); and

(13) Enabling overcurrent protection (OCP) for the DBS and returning control to a failover/failback control method (1613) (step (2) (1420) in FIG. 14 (1400)).

One skilled in the art will recognize that these method steps may be augmented or rearranged and some steps may be added or omitted without limiting the teachings of the present invention. This general method overview may be augmented by the various elements described herein to produce a wide variety of invention embodiments consistent with this overall design description.

Power Supply Fallback Method (1700)-(1900)

Figure 19:
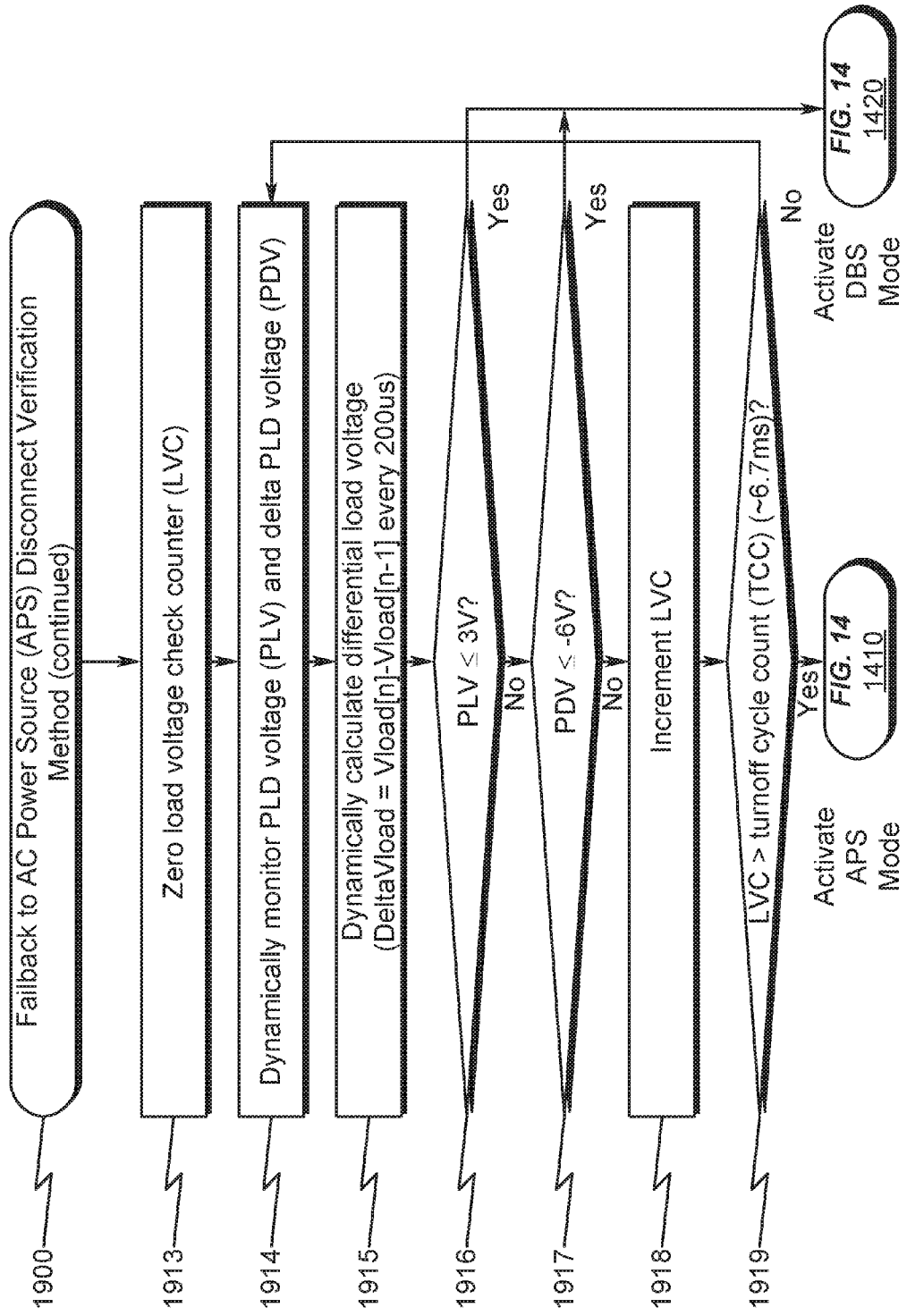
FIG. 19 illustrates a flowchart depicting an exemplary failback to AC power source (APS) disconnect verification method.

Concurrent with the failover method described above, a failback method may be used to switch from a DC battery backup power source (DBS) to an AC power source (APS). An exemplary embodiment of a present invention power supply failback method (corresponding to the DC-to-AC switch failback timing diagram (1320) of FIG. 13 (1300)) is depicted in the flowcharts of FIG. 17 (1700)-FIG. 19 (1900) and involves the following steps:

(1) Initializing an AC power source cycle counter (ACC) to a predetermined number of recovery cycles (~250) (1701);

(2) Monitor the APS individual cycle peak voltage level (APV) (1702);

(3) Determining if (200V≤APV≤250V), and if not, activating DC backup mode by proceeding to monitor the per-cycle status of line voltage in the failover/failback method (step (2) of FIG. 14 (1420)) (1703);

(4) Monitoring the APS frequency (APF) (1704);

(5) Determining if (30 Hz≤APF≤90 Hz), and if not, activating DC backup mode by proceeding to monitor the per-cycle status of line voltage in the failover/failback method (step (2) of FIG. 14 (1420)) (1705);

(6) Decrementing the ACC (1706);

(7) Determining if the ACC has reached zero, and if not, proceeding to step (2) (1707);

(8) Monitoring the APS phase angle (APP) and waiting for the APS voltage to decrease (1808);

(9) Determining if (90 degrees≤APP≤180 degrees), and if not, proceeding to step (8) (1809) (due to DC relay turnoff speed being much slower than the IGBT the voltage differential going between AC power to DC battery may not be important as would be the inrush current from the AC input to DC battery through the body diode of the IGBT and DC relay);

(10) Monitoring the APS voltage (APV) and DPS voltage (DPV) (1810);

(11) Determining if the (APV−DPV) differential voltage is less than or equal to 20V, and if not, proceeding to step (8) (1811);

(12) Disabling the DC battery IGBT switch, DC battery SCR, and DC battery DC relay (1812);

(13) Zeroing a load voltage check counter (LVC) (1913);

(14) Dynamically monitoring the PLD voltage (PLV) and delta PLD voltage (PDV) on a periodic basis (1914);

(15) Dynamically calculating a differential load voltage (DeltaVload=Vpld[n−1]−Vpld[n]) (PDV) on a periodic basis (1915);

(16) Determining if the PLV is less than or equal to 3V, and if so, activating DC backup mode by proceeding to monitor the per-cycle status of line voltage in the failover/failback method (step (2) of FIG. 14 (1420)) (1916);

(17) Determining if the PDV is less than or equal to −6V, and if so, activating DC backup mode by proceeding to monitor the per-cycle status of line voltage in the failover/failback method (step (2) of FIG. 14 (1420)) (1917);

(18) Incrementing the LVC (1918);

(19) Determining if the LVC has exceeded a predetermined turnoff cycle count (TCC) (~6.7 ms), and if not, proceeding to step (15) (1919); and

(20) activating AC operation mode by initializing the configuration to activate the AC relay and AC SCR ON in the failover/failback method (step (1) of FIG. 14 (1410)) (1920).

One skilled in the art will recognize that these method steps may be augmented or rearranged and some steps may be added or omitted without limiting the teachings of the present invention. This general method overview may be augmented by the various elements described herein to produce a wide variety of invention embodiments consistent with this overall design description.

Power Supply Overcurrent Method (2000)-(2400)

Figure 24:
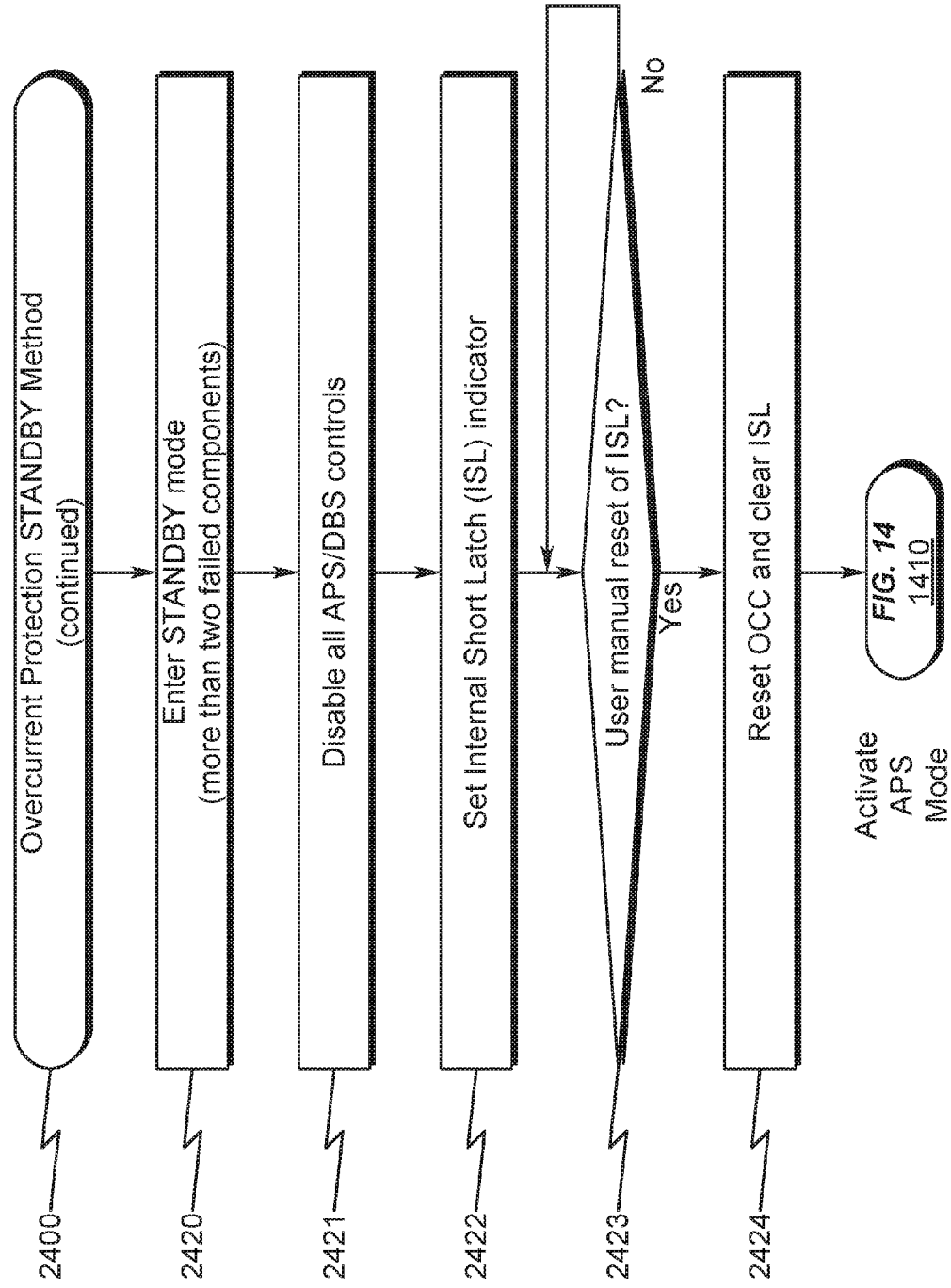
FIG. 24 illustrates a flowchart (5 of 5) depicting an exemplary overcurrent protection (OCP) method.

Concurrent with the failover/failback methods described above, an overcurrent protection method may be used to prevent shorting the DC battery backup power source (DBS) to the AC power source (APS) in the event of a switch and/or device failure in the system. An exemplary embodiment of a present invention power supply overcurrent protection method (corresponding to the timing diagram (1330) of FIG. 13 (1300)) is depicted in the flowcharts of FIG. 20 (2000)-FIG. 24 (2400) and involves the following steps:

(1) monitoring an AC overcurrent protection (AOP) and DC battery overcurrent protection (BOP) overcurrent sensors (2001);

(2) determining if an overcurrent protection (OCP) condition is detected, and if not, proceeding to step (1) (2002);

(3) Determining if an OCP condition occurred within the last 11 seconds, and if so, proceeding to step (20) (FIG. 20 (2420)) (2003) (this set the system in a STANDBY state until released by the user);

(4) Initializing an overcurrent protection counter (OCC) to zero (2004);

(5) Configuring AC SCRs to disconnect the APS from the PLD (2005);

(6) Determining if a half cycle of APS power has elapsed, and if not, proceeding to step (5) (2006);

(7) Enabling FSC control outputs to the APS and DBS (2007);

(8) Incrementing the OCC counter (2108);

(9) Determining the current operational mode of the FSC (AC, bypass, or DC) (2109);

(10) Determining if the current FSC operational mode is AC, and if so, proceeding to step (13) (2110);

(11) Determining if the current FSC operational mode is BYPASS, and if so, proceeding to step (13) (2111);

(12) Determining if the current FSC operational mode is DC, and if so, proceeding to step (17) (2112);

(13) Determining if (∥VDC−VSCR∥<10V) (battery and SCR differ by less than 10 VDC), and if not, proceeding to step (20) (2213);

(14) Preventing the FSC from allowing failback to AC mode (as the DC SCR or DC relay may be shorted) (2214);

(15) Determining if the OCP counter (OCC)<2, and if not, proceeding to step (20) (2215);

(16) Enabling the IGBT, DC SCR, and DC RELAY and activating DC backup mode by proceeding to monitor the per-cycle status of line voltage in the failover/failback method (step (2) of FIG. 14 (1420)) (2216);

(17) Determining if the manual bypass switch (MBS) is enabled, and if so, proceeding to step (20) (2317);

(18) Determining if the OCP counter (OCC) is greater than or equal to 2, and if so, proceeding to step (20) (2318);

(19) Enabling the IGBT, DC SCR, and DC RELAY and activating DC backup mode by proceeding to monitor the per-cycle status of line voltage in the failover/failback method (step (2) of FIG. 14 (1420)) (2319);

(20) Entering STANDBY mode in which APS and DPS are disconnected from the PLD (more than two components in the system may have failed or are compromised) (2420);

(21) Disabling all APS/DBS controls from the PLD (2421);

(22) Setting an Internal Short Latch (ISL) indicator to indicate a MANUAL RESET is required by the user to restart the system (2422);

(23) Determining if a MANUAL RESET has been input by the user, and if not, proceeding to step (23) (2423);

(24) Resetting the OCP counter (OCC) to zero, clearing the ISL, and activating AC operation mode by initializing the configuration to activate the AC relay and AC SCR in the failover/failback method (step (1) of FIG. 14 (1410)) (2424).

One skilled in the art will recognize that these method steps may be augmented or rearranged and some steps may be added or omitted without limiting the teachings of the present invention. This general method overview may be augmented by the various elements described herein to produce a wide variety of invention embodiments consistent with this overall design description.

Preferred Embodiment System Summary

The present invention preferred exemplary system embodiment anticipates a wide variety of variations in the basic theme of construction, but can be generalized as a power supply failover system comprising:

(a) failover switch controller (FSC);
(b) AC current/voltage (I/V) monitor (AIV);
(c) AC cycle counter (ACC);
(d) failover switch timer (FST);
(e) overcurrent protection timer (OPT);
(f) manual bypass switch (MBS);
(g) bypass phase switch (BPS);
(h) bypass relay switch (BRS);
(i) AC phase switch (ACS);
(j) AC relay (ACR);
(k) DC switch (DCS);
(l) battery isolation switch (BIS);
(m) AC power source (APS);
(n) AC/DC battery charger (ABC);
(o) DC battery power source (DBS);
(p) battery overcurrent protection device (BOP); and
(q) AC overcurrent protection device (AOP);

wherein:
the APS and the ACB are connected in series between a reference neutral connection (RNC) and an AC power node (APN);
the MBS is connected in series with a protected load device (PLD) between the APS and the RNC;
the series connection between the MBS and the PLD forming a protected load node (PLN) at the connection between the MBS and the PLD;
the ACR is connected in series with the ACS between the APN and the PLN;
the BRS is connected in series with the BPS between the APN and the PLN;
the ABC comprises an AC input and a DC output;
the AOP is connected in series between the APN and the ABC AC input;
the DBC and the BOP are connected in series between the RNC and the ABC DC output;
the BIS and the DCS are connected in series between the ABC DC output and the PLN;
the AOP is configured to provide configurable overcurrent protection for the APS;
the AOP is configured to provide configurable overcurrent protection for the DBS;
the AIV is configured to monitor voltage supplied by the APS and current supplied by the APS;
the ACC is configured to count voltage cycles supplied by the APS;
the FST is configured as a resettable timer under control of the FSC;
the OPT is configured as a resettable timer under control of the FSC;
the FSC inhibits operation of the AOP and the BOP based on the timer value of the OPT;
the FSC initiates operation of the OPT during transitions of the ACS, the BPS, the BIS, and the DCS; and
the FSC is configured to read the AIV, the ACC, the FST, and the OPT to determine the operation of the ACR, the ACS, the BRS, the BPS, the BIS, and the DCS to supply uninterrupted power to the PLD from either the APS or the DBS.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a power supply failover method, the method operating in conjunction with a power supply failover system comprising:
(a) failover switch controller (FSC);
(b) AC current/voltage (I/V) monitor (AIV);
(c) AC cycle counter (ACC);
(d) failover switch timer (FST);
(e) overcurrent protection timer (OPT);
(f) manual bypass switch (MBS);
(g) bypass phase switch (BPS);
(h) bypass relay switch (BRS);
(i) AC phase switch (ACS);
(j) AC relay (ACR);
(k) DC switch (DCS);
(l) battery isolation switch (BIS);
(m) AC power source (APS);
(n) AC/DC battery charger (ABC);
(o) DC battery power source (DBS);
(p) battery overcurrent protection device (BOP); and
(q) AC overcurrent protection device (AOP);
wherein:
the APS and the ACB are connected in series between a reference neutral connection (RNC) and an AC power node (APN);
the MBS is connected in series with a protected load device (PLD) between the APS and the RNC;
the series connection between the MBS and the PLD forming a protected load node (PLN) at the connection between the MBS and the PLD;
the ACR is connected in series with the ACS between the APN and the PLN;
the BRS is connected in series with the BPS between the APN and the PLN;
the ABC comprises an AC input and a DC output;
the AOP is connected in series between the APN and the ABC AC input;
the DBC and the BOP are connected in series between the RNC and the ABC DC output;
the BIS and the DCS are connected in series between the ABC DC output and the PLN;
the AOP is configured to provide configurable overcurrent protection for the APS;
the AOP is configured to provide configurable overcurrent protection for the DBS;
the AIV is configured to monitor voltage supplied by the APS and current supplied by the APS;
the ACC is configured to count voltage cycles supplied by the APS;
the FST is configured as a resettable timer under control of the FSC;
the OPT is configured as a resettable timer under control of the FSC;
the FSC inhibits operation of the AOP and the BOP based on the timer value of the OPT;
the FSC initiates operation of the OPT during transitions of the ACS, the BPS, the BIS, and the DCS; and
the FSC is configured to read the AIV, the ACC, the FST, and the OPT to determine the operation of the ACR, the ACS, the BRS, the BPS, the BIS, and the DCS to supply uninterrupted power to the PLD from either the APS or the DBS;
wherein the method comprises the steps of:
(1) With the FSC, initially configuring the power supply failover system for AC operation by enabling the ACR and the ACS to electrically couple the APS to the PLD;
(2) With the FSC, monitoring a voltage from the APS using the AIV;
(3) With the FCS, determining if the APS voltage is greater than or equal to 264V, and if so, proceeding to step (6);
(4) With the FCS, determining if the APS voltage is less than or equal to 180V, and if so, proceeding to step (6);
(5) With the FCS, determining if AC operation is currently in effect, and if so, proceeding to step (2), otherwise proceeding to step (7);
(6) With the FCS, activating a power failover method to switch between AC power from the APS and DC backup power from the DBS by deactivating the ACR and the ACS and activating the BIS and the DCS and proceeding to step (2); and
(7) With the FCS, activating a power failback method to switch between DC backup power from the DBS and AC power from the APS by deactivating the BIS and the DCS and activating the ACR and the ACS and proceeding to step (1).

One skilled in the art will recognize that these method steps may be augmented or rearranged and some steps may be added or omitted without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the PLD further comprises an AC+DC power supply.
An embodiment wherein the DCS comprises an IGBT.
An embodiment wherein the BIS comprises a SCR in parallel with a relay.
An embodiment wherein the ACS comprises two SCRs connected in an inverted parallel configuration.
An embodiment wherein the BPS comprises two SCRs connected in an inverted parallel configuration.
An embodiment wherein the ABC further comprises a power factor correction (PFC) circuit electrically coupled to a phase shift full bridge converter (FSFB) battery charging circuit.
An embodiment wherein the FSC is configured to transition between supplying the ACS to the PLD and supplying the DCS to the PLD after a delay of one-half AC cycle as counted by the ACC.
An embodiment wherein the FSC is configured to determine if a shorting fault exists in circuitry within the ACS, the BPS, the BIS, or the DCS before initiating a transition between power from the APS and the DBS, and if the shorting fault is detected, entering a STANDBY mode in which transitions between power supplied from the APS and power supplied from the DBS are inhibited.
An embodiment wherein an additional AC master breaker (ACB) and manual bypass switch (MBS) are inserted in parallel between the APS and the RNC and serve to enable full isolation between the APS from the RNC.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710, 578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A power supply failover system/method providing uninterruptable power to protected load devices (PLD) has been disclosed. The system includes a failover switch controller (FSC) with inputs from an AC I/V monitor (AIV), AC cycle counter (ACC), failover switch timer (FST), and overcurrent protection timer (OPT). The FSC utilizes these inputs to control failsafe switching of a bypass phase switch (BPS) and AC phase switch (ACS) to the PLD when power from the APS is determined to be good by the AIV. When power from the APS is determined to be compromised by the AIV, the FPS disables the ACS/BPS and enables a DC switch (DCS) and battery isolation switch (BIS) to connect a DC source to the PLD after a time period determined by the FST. APS/DCS overcurrent protection is limited by OPT intervals allowing a smooth transition between the APS to DCS during power failover/failback.

CLAIMS INTERPRETATION

The following rules apply when interpreting the CLAIMS of the present invention:

The CLAIM PREAMBLE should be considered as limiting the scope of the claimed invention.
"WHEREIN" clauses should be considered as limiting the scope of the claimed invention.
"WHEREBY" clauses should be considered as limiting the scope of the claimed invention.
"ADAPTED TO" clauses should be considered as limiting the scope of the claimed invention.
"ADAPTED FOR" clauses should be considered as limiting the scope of the claimed invention.
The term "MEANS" specifically invokes the means-plus-function claims limitation recited in 35 U.S.C. § 112(f) and such claim shall be construed to cover the corresponding structure, material, or acts described in the specification and equivalents thereof.
The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, "'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A power supply failover system comprising:
   (a) failover switch controller (FSC);
   (b) AC current/voltage (I/V) monitor (AIV);
   (c) AC cycle counter (ACC);
   (d) failover switch timer (FST);
   (e) overcurrent protection timer (OPT);
   (f) manual bypass switch (MBS);
   (g) bypass phase switch (BPS);
   (h) bypass relay switch (BRS);
   (i) AC phase switch (ACS);
   (j) AC relay (ACR);
   (k) DC switch (DCS);
   (l) battery isolation switch (BIS);
   (m) AC power source (APS);
   (n) AC/DC battery charger (ABC);
   (o) DC battery power source (DBS);
   (p) battery overcurrent protection device (BOP); and
   (q) AC overcurrent protection device (AOP);
   wherein:
   said APS and said ABC are connected in series between a reference neutral connection (RNC) and an AC power node (APN);
   said MBS is connected in series with a protected load device (PLD) between said APS and said RNC;
   said series connection between said MBS and said PLD forming a protected load node (PLN) at the connection between said MBS and said PLD;
   said ACR is connected in series with said ACS between said APN and said PLN;
   said BRS is connected in series with said BPS between said APN and said PLN;
   said ABC comprises an AC input and a DC output;
   said AOP is connected in series between said APN and said ABC AC input;
   said DBC and said BOP are connected in series between said RNC and said ABC DC output;
   said BIS and said DCS are connected in series between said ABC DC output and said PLN;
   said AOP is configured to provide configurable overcurrent protection for said APS;
   said AOP is configured to provide configurable overcurrent protection for said DBS;
   said AIV is configured to monitor voltage supplied by said APS and current supplied by said APS;
   said ACC is configured to count voltage cycles supplied by said APS;
   said FST is configured as a resettable timer undercontrol of said FSC;
   said OPT is configured as a resettable timer under control of said FSC;
   said FSC inhibits operation of said AOP and said BOP based on the timer value of said OPT;
   said FSC initiates operation of said OPT during transitions of said ACS, said BPS, said BIS, and said DCS; and
   said FSC is configured to read said Aft, said ACC, said FST, and said OPT to determine the operation of said ACR, said ACS, said BRS, said BPS, said BIS, and said DCS to supply uninterrupted power to said PLD from either said APS or said DBS.

2. The power supply failover system of claim 1 wherein said PLD further comprises an AC+DC power supply.

3. The power supply failover system of claim 1 wherein said DCS comprises an IGBT.

4. The power supply failover system of claim 1 wherein said BIS comprises a SCR in parallel with a relay.

5. The power supply failover system of claim 1 wherein said ACS comprises two SCRs connected in an inverted parallel configuration.

6. The power supply failover system of claim 1 wherein said BPS comprises two SCRs connected in an inverted parallel configuration.

7. The power supply failover system of claim 1 wherein said ABC further comprises a power factor correction (PFC) circuit electrically coupled to a phase shift full bridge converter (FSFB) battery charging circuit.

8. The power supply failover system of claim 1 wherein said FSC is configured to transition between supplying said ACS to said PLD and supplying said DCS to said PLD after a delay of one-half AC cycle as counted by said ACC.

9. The power supply failover system of claim 1 wherein said FSC is configured to determine if a shorting fault exists in circuitry within said ACS, said BPS, said BIS, or said DCS before initiating a transition between power from said APS and said DBS, and if said shorting fault is detected, entering a STANDBY mode in which transitions between power supplied from said APS and power supplied from said DBS are inhibited.

10. The power supply failover system of claim 1 wherein an additional AC master breaker (ACB) and manual bypass switch (MBS) are inserted in parallel between said APS and said RNC and serve to enable full isolation between said APS from said RNC.

11. A power supply failover method, said method operating in conjunction with a power supply failover system, said system comprising:
(a) failover switch controller (FSC);
(b) AC current/voltage (I/V) monitor (AIV);
(c) AC cycle counter (ACC);
(d) failover switch timer (FST);
(e) overcurrent protection timer (OPT);
(f) manual bypass switch (MBS);
(g) bypass phase switch (BPS);
(h) bypass relay switch (BRS);
(i) AC phase switch (ACS);
(j) AC relay (ACR);
(k) DC switch (DCS);
(l) battery isolation switch (BIS);
(m) AC power source (APS);
(n) AC/DC battery charger (ABC);
(o) DC battery power source (DBS);
(p) battery overcurrent protection device (BOP); and
(q) AC overcurrent protection device (AOP);
wherein:
said APS and said ABC are connected in series between a reference neutral connection (RNC) and an AC power node (APN);
said MBS is connected in series with a protected load device (PLD) between said APS and said RNC;
said series connection between said MBS and said PLD forming a protected load node (PLN) at the connection between said MBS and said PLD;
said ACR is connected in series with said ACS between said APN and said PLN;
said BRS is connected in series with said BPS between said APN and said PLN;
said ABC comprises an AC input and a DC output;
said AOP is connected in series between said APN and said ABC AC input;
said DBC and said BOP are connected in series between said RNC and said ABC DC output;
said BIS and said DCS are connected in series between said ABC DC output and said PLN;
said AOP is configured to provide configurable overcurrent protection for said APS;
said AOP is configured to provide configurable overcurrent protection for said DBS;
said AIV is configured to monitor voltage supplied by said APS and current supplied by said APS;
said ACC is configured to count voltage cycles supplied by said APS;
said FST is configured as a resettable timer under control of said FSC;
said OPT is configured as a resettable timer under control of said FSC;
said FSC inhibits operation of said AOP and said BOP based on the timer value of said OPT;
said FSC initiates operation of said OPT during transitions of said ACS, said BPS, said BIS, and said DCS; and
said FSC is configured to read said AIV, said ACC, said FST, and said OPT to determine the operation of said ACR, said ACS, said BRS, said BPS, said BIS, and said DCS to supply uninterrupted power to said PLD from either said APS or said DBS;
wherein said method comprises the steps of:
(1) With said FSC, initially configuring said power supply failover system for AC operation by enabling said ACR and said ACS to electrically couple said APS to said PLD;
(2) With said FSC, monitoring a voltage from said APS using said AIV;
(3) With said FCS, determining if said APS voltage is greater than or equal to 264V, and if so, proceeding to step (6);
(4) With said FCS, determining if the APS voltage is less than or equal to 180V, and if so, proceeding to step (6);
(5) With said FCS, determining if AC operation is currently in effect, and if so, proceeding to step (2), otherwise proceeding to step (7);
(6) With said FCS, activating a power failover method to switch between AC power from said APS and DC backup power from said DBS by deactivating said ACR and said ACS and activating said BIS and said DCS and proceeding to step (2); and
(7) With said KS, activating a power fallback method to switch between DC backup power from said DBS and AC power from said APS by deactivating said BIS and said DCS and activating said ACR and said ACS and proceeding to step (1).

12. The power supply failover method of claim 11 wherein said PLD further comprises an AC+DC power supply.

13. The power supply failover method of claim 11 wherein said DCS comprises an IGBT.

14. The power supply failover method of claim 11 wherein said BIS comprises a SCR in parallel with a relay.

15. The power supply failover method of claim 11 wherein said ACS comprises two SCRs connected in an inverted parallel configuration.

16. The power supply failover method of claim 11 wherein said BPS comprises two SCRs connected in an inverted parallel configuration.

17. The power supply failover method of claim 11 wherein said ABC further comprises a power factor correction (PFC) circuit electrically coupled to a phase shift full bridge converter (FSFB) battery charging circuit.

18. The power supply failover method of claim 11 wherein said FSC is configured to transition between supplying said ACS to said PLD and supplying said DCS to said PLD after a delay of one-half AC cycle as counted by said ACC.

19. The power supply failover method of claim 11 wherein said FSC is configured to determine if a shorting fault exists in circuitry within said ACS, said BPS, said BIS, or said DCS before initiating a transition between power from said APS and said DBS, and if said shorting fault is detected, entering a STANDBY mode in which transitions between power supplied from said APS and power supplied from said DBS are inhibited.

20. The power supply failover method of claim 11 wherein an additional AC master breaker (ACB) and manual bypass switch (MBS) are inserted in parallel between said APS and said RNC and serve to enable full isolation between said APS from said RNC.

21. A tangible non-transitory computer usable medium having computer-readable program code means comprising a power supply failover method, said method operating in conjunction with a power supply failover system, said system comprising:
(a) failover switch controller (FSC);
(b) AC current/voltage (I/V) monitor (AIV);

(c) AC cycle counter (ACC);
(d) failover switch timer (FST);
(e) overcurrent protection timer (OPT);
(f) manual bypass switch (MBS);
(g) bypass phase switch (BPS);
(h) bypass relay switch (BRS);
(i) AC phase switch (ACS);
(j) AC relay (ACR);
(k) DC switch (DCS);
(l) battery isolation switch (BIS);
(m) AC power source (APS);
(n) AC/DC battery charger (ABC);
(o) DC battery power source (DBS);
(p) battery overcurrent protection device (BOP); and
(q) AC overcurrent protection device (AOP);
wherein:
said APS and said ABC are connected in series between a reference neutral connection (RNC) and an AC power node (APN);
said MBS is connected in series with a protected load device (PLD) between said APS and said RNC;
said series connection between said MBS and said PLD forming a protected load node (PLN) at the connection between said MBS and said PLD;
said ACR is connected in series with said ACS between said APN and said PLN;
said BRS is connected in series with said BPS between said APN and said PLN;
said ABC comprises an AC input and a DC output;
said AOP is connected in series between said APN and said ABC AC input;
said DBC and said BOP are connected in series between said RNC and said ABC DC output;
said BIS and said DCS are connected in series between said ABC DC output and said PLN;
said AOP is configured to provide configurable overcurrent protection for said APS;
said AOP is configured to provide configurable overcurrent protection for said DBS;
said AIV is configured to monitor voltage supplied by said APS and current supplied by said APS;
said ACC is configured to count voltage cycles supplied by said APS;
said FST is configured as a resettable timer under control of said FSC;
said OPT is configured as a resettable timer under control of said FSC;
said FSC inhibits operation of said AOP and said BOP based on the timer value of said OPT;
said FSC initiates operation of said OPT during transitions of said ACS, said BPS, said BIS, and said DCS; and
said FSC is configured to read said AIV, said ACC, said FST, and said OPT to determine the operation of said ACR, said ACS, said BRS, said BPS, said BIS, and said DCS to supply uninterrupted power to said PLD from either said APS or said DBS;

wherein said method comprises the steps of:
(1) With said FSC, initially configuring said power supply failover system for AC operation by enabling said ACR and said ACS to electrically couple said APS to said PLD;
(2) With said FSC, monitoring a voltage from said APS using said AIV;
(3) With said FCS, determining if said APS voltage is greater than or equal to 264V, and if so, proceeding to step (6);
(4) With said FCS, determining if the APS voltage is less than or equal to 180V, and if so, proceeding to step (6);
(5) With said FCS, determining if AC operation is currently in effect, and if so, proceeding to step (2), otherwise proceeding to step (7);
(6) With said FCS, activating a power failover method to switch between AC power from said APS and DC backup power from said DBS by deactivating said ACR and said ACS and activating said BIS and said DCS and proceeding to step (2); and
(7) With said KS, activating a power fallback method to switch between DC backup power from said DBS and AC power from said APS by deactivating said BIS and said DCS and activating said ACR and said ACS and proceeding to step (1).

22. The computer usable medium of claim 21 wherein said PLD further comprises an AC+DC power supply.

23. The computer usable medium of claim 21 wherein said DCS comprises an IGBT.

24. The computer usable medium of claim 21 wherein said BIS comprises a SCR in parallel with a relay.

25. The computer usable medium of claim 21 wherein said ACS comprises two SCRs connected in an inverted parallel configuration.

26. The computer usable medium of claim 21 wherein said BPS comprises two SCRs connected in an inverted parallel configuration.

27. The computer usable medium of claim 21 wherein said ABC further comprises a power factor correction (PFC) circuit electrically coupled to a phase shift full bridge converter (FSFB) battery charging circuit.

28. The computer usable medium of claim 21 wherein said FSC is configured to transition between supplying said ACS to said PLD and supplying said DCS to said PLD after a delay of one-half AC cycle as counted by said ACC.

29. The computer usable medium of claim 21 wherein said FSC is configured to determine if a shorting fault exists in circuitry within said ACS, said BPS, said BIS, or said DCS before initiating a transition between power from said APS and said DBS, and if said shorting fault is detected, entering a STANDBY mode in which transitions between power supplied from said APS and power supplied from said DBS are inhibited.

30. The computer usable medium of claim 21 wherein an additional AC master breaker (ACB) and manual bypass switch (MBS) are inserted in parallel between said APS and said RNC and serve to enable full isolation between said APS from said RNC.

* * * * *